US012747878B2

(12) United States Patent
Lee et al.

(10) Patent No.: US 12,747,878 B2
(45) Date of Patent: Sep. 29, 2026

(54) HUMIDIFIER

(71) Applicant: LG ELECTRONICS INC., Seoul (KR)

(72) Inventors: Sangheon Lee, Seoul (KR); Kyunglok Cho, Seoul (KR); Kunyoung Lee, Seoul (KR); Wonjun Jeong, Seoul (KR)

(73) Assignee: LG ELECTRONICS INC., Seoul (KR)

(*) Notice: Subject to any disclaimer, the term of this patent is extended or adjusted under 35 U.S.C. 154(b) by 61 days.

(21) Appl. No.: 18/647,014

(22) Filed: Apr. 26, 2024

(65) Prior Publication Data

US 2024/0280995 A1 Aug. 22, 2024

(30) Foreign Application Priority Data

Apr. 27, 2023 (KR) ........................ 10-2023-0055140

(51) Int. Cl.
*F24F 6/12* (2006.01)
*F24F 11/00* (2018.01)
(Continued)

(52) U.S. Cl.
CPC ............ *F24F 6/12* (2013.01); *F24F 11/0008* (2013.01); *F24F 11/30* (2018.01); *F24F 11/62* (2018.01); *G06N 20/00* (2019.01); *Y02B 30/70* (2013.01)

(58) Field of Classification Search
CPC .......... F24F 11/0008; F24F 6/12; F24F 13/32; F24F 11/38; F24F 11/61; F24F 2006/008;
(Continued)

(56) References Cited

U.S. PATENT DOCUMENTS 5,563,811 A * 10/1996 Embree ............... B05B 17/0615 331/109
2014/0151907 A1* 6/2014 Kanel ....................... F24F 6/02 261/133
(Continued)

FOREIGN PATENT DOCUMENTS

CN 107576868 1/2018
JP S52-19958 2/1977
(Continued)

OTHER PUBLICATIONS

KR20180113257A EPO Translation with Paragraph Numbers (Year: 2018).*
(Continued)

*Primary Examiner* — Aniss Chad
(74) *Attorney, Agent, or Firm* — KED & ASSOCIATES, LLP

(57) ABSTRACT

A humidifier according to an embodiment includes: a case; and a humidifying assembly disposed in the case and configured to generate mist, wherein the humidifying assembly includes a humidifying chamber defining a space in which water is contained, and first and second ultrasonic vibrators disposed under the humidifying chamber, wherein the humidifying assembly is configured to drive one of the first and second ultrasonic vibrators, or to drive the first and second ultrasonic vibrators with different driving signals, thereby adjusting the direction and shape of mist and providing various mist modes.

16 Claims, 15 Drawing Sheets

(51) Int. Cl.
*F24F 11/30* (2018.01)
*F24F 11/62* (2018.01)
*G06N 20/00* (2019.01)

(58) Field of Classification Search
CPC .......... F24F 11/30; F24F 11/62; G06N 20/00; Y02B 30/70
See application file for complete search history.

(56) References Cited

U.S. PATENT DOCUMENTS

| | | | | |
|---|---|---|---|---|
| 2018/0093291 | A1 * | 4/2018 | Benjamin | F24F 6/12 |
| 2020/0129709 | A1 * | 4/2020 | Ky | A61M 16/024 |

FOREIGN PATENT DOCUMENTS

| | | | | |
|---|---|---|---|---|
| JP | 2011-056192 | | 3/2011 | |
| JP | 6563287 | B2 * | 8/2019 | F24F 6/00 |
| JP | 2021-058232 | | 4/2021 | |
| KR | 10-0158806 | | 1/1999 | |
| KR | 10-0158950 | | 1/1999 | |
| KR | 20060134403 | A * | 12/2006 | Y02B 30/70 |
| KR | 10-2011-0067528 | | 6/2011 | |
| KR | 10-2018-0094813 | | 8/2018 | |
| KR | 20180113257 | A * | 10/2018 | F24F 13/28 |
| KR | 10-2019-0052191 | | 5/2019 | |
| KR | 10-2049989 | | 11/2019 | |

OTHER PUBLICATIONS

KR20060134403A EPO Translation with line Nos. appended and EPO translation (Year: 2006).*
JP6563287B2 EPO Translation with Paragraph Numbers (Year: 2019).*
Extended European Search Report dated Oct. 7, 2024 issued in Application No. 24172341.0.

* cited by examiner (a)

(b)

HUMIDIFIER

CROSS-REFERENCE TO RELATED APPLICATION(S)

This application claims priority under 35 U.S.C. § 119 to Korean Application No. 10-2023-0055140, filed in Korea on Apr. 27, 2023, whose entire disclosure(s) is/are hereby incorporated by reference.

BACKGROUND

1. Field

The present disclosure relates to a humidifier to supply humidified air.

2. Background

A humidifier is a device that supplies moisture-containing, humidified air to an indoor space. The humidifier may include a water tank and may be classified into various types, such as ultrasonic humidifiers, heated humidifiers, evaporative humidifiers, or complex humidifiers, depending on methods used by the humidifier to convert the water in the tank into the humidified air. For example, a humidifier may vaporize water in the tank to form humidified air with high moisture content, and the humidifier may vaporize the water using natural vaporization, heating vaporization, ultrasonic vibration, or a combination thereof.

Each vaporization method has its own merits and disadvantages. As an example, an evaporative humidification method may use a humidifying medium that draws water over a larger surface area for faster evaporation, but a user may need to frequently clean or replace the humidifying medium to maintain performance and cleanliness. In another example, heating vaporization may cause relatively hot humidified air to be directly discharged into the indoor space, but potentially allowing a safety accident to occur.

The ultrasonic humidifier may include a vibrator to generate ultrasonic waves, and humidified air may be formed by water that is atomized by the ultrasonic waves. The ultrasonic humidifier may output a relatively large amount of mist, but air that is humidified by atomizing supplied water by ultrasonic vibration may not effectively flow into an indoor space. Additionally, if unsterilized water is used for humidification, air carrying the unsterilized water may flow into the indoor space, and the ultrasonic vibrator may be vulnerable damage from high-temperature heat.

Korean Laid-Open Patent Publication No. KR10-2018-0094813 provides an example of a humidifier that provides heated humidified air. Korean Patent No. KR 10-0158806 provides an example of a humidifier that processes water, supplied from a water tank, by a combination of heating and ultrasonic vibrations. However, these and other humidifiers may typically only allow for limited adjustment of a discharge port for discharging humidified air, for instance, by allowing users to manually adjust louvres or another mechanical part, such that a direction of mist flowing inside/outside of the humidifier may not be easily and effectively adjusted.

The above references are incorporated by reference herein where appropriate for appropriate teachings of additional or alternative details, features and/or technical background.

BRIEF DESCRIPTION OF THE DRAWINGS

Embodiments will be described in detail with reference to the following drawings in which like reference numerals refer to like elements, and wherein.

DETAILED DESCRIPTION

Figure 1:
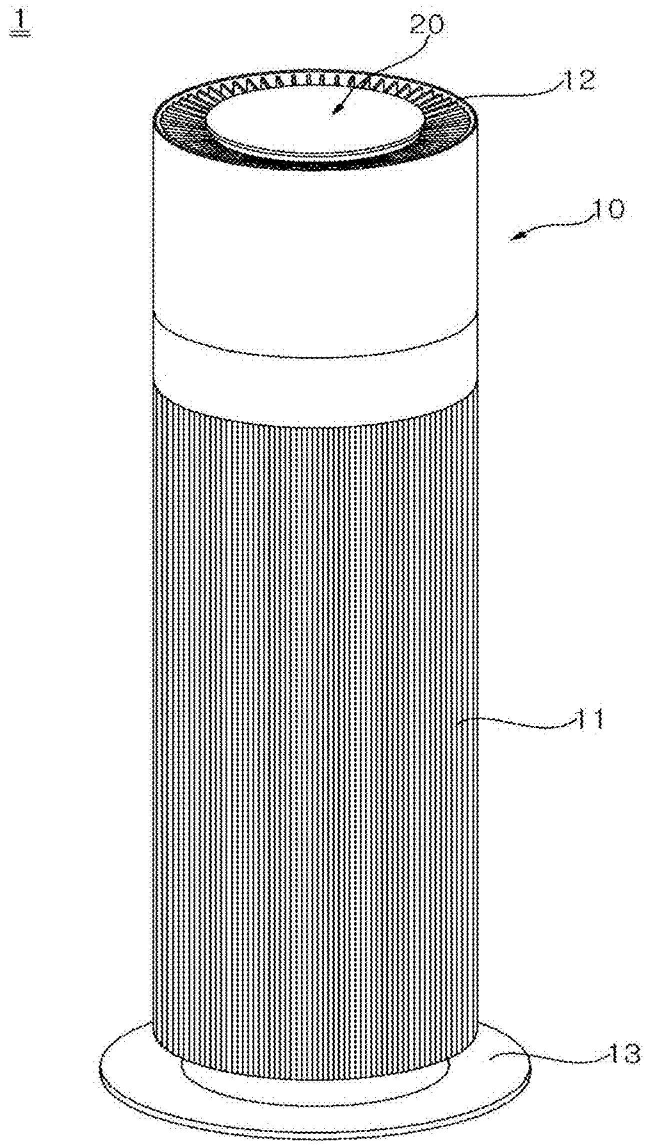
FIG. 1 is a perspective view of a humidifier according to an embodiment.

Hereinafter, the present disclosure will be described in detail with reference to the accompanying drawings, in which the same reference numerals are used throughout the drawings to designate the same or similar components, and a redundant description thereof will be omitted. The terms "module" and "unit" for elements used in the following description are given simply in view of the ease of the description, and do not have a distinguishing meaning or role.

It will be noted that a detailed description of known arts will be omitted if it is determined that the detailed description of the known arts can obscure the embodiments of the invention. Further, the accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that, although the terms first, second, etc., may be used herein to describe various elements, these elements should not be limited by these terms. These terms are only used to distinguish one element from another.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the singular forms are intended to include the plural forms as well, unless the context clearly indicates otherwise.

Referring to FIG. 1, aspects of a humidifier 1 will be described. FIG. 1 is a perspective view of the humidifier 1 according to an embodiment.

The humidifier 1 may include a case 10. The case 10 may have a space formed therein. The case 10 may have a cylindrical or other shape.

The humidifier 1 may include a suction port (or inlet) 11. In one example, the suction port 11 may be formed along the circumference of the case 10, but the suction port 11 may be provided in different locations. Air from outside the humidifier 1 may be introduced into the case 10 through the suction port 11.

The humidifier 1 may include a discharge port (or outlet) 12. The discharge port 12 may be formed at a top portion of the case 10, but the discharge port 12 may be provided in different locations. The air drawn into the case 10 may be discharged to the outside of the case 10 through the discharge port 12.

The humidifier 1 may include a base 13. The base 13 may be disposed at the bottom of the case 10. In certain configurations of the humidifier 1, the base 13 may have a greater outer diameter than an outer diameter of the case 10, such as to improve a stability of humidifier 1 or to provide a desired appearance.

The humidifier 1 may include a water tank 20. The water tank 20 may be disposed in the case 10. The water tank 20 may have a space in which water is contained. In one example, the discharge port 12 may be formed radially outside of the water tank 20. For example, the discharge port 12 may be formed to surround at least a portion of the water tank 20.

Figure 2:
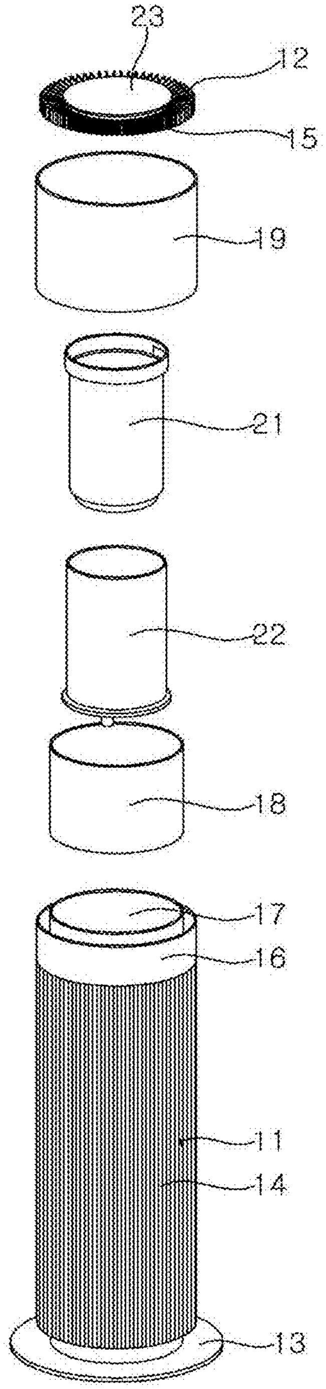
FIG. 2 is an exploded view of a humidifier according to an embodiment.

Referring to FIG. 2, aspects of the humidifier 1 will be described. FIG. 2 is an exploded view of the humidifier 1. The humidifier 1 may have a suction grill 14. The suction grill 14 may be disposed along the circumference of the case 10. The suction grill 14 may form at least a portion of the suction port 11. The suction grill 14 may have a substantially cylindrical shape or other shape corresponding to a shape of case 10.

The humidifier 1 may include a discharge grill 15. The discharge grill 15 may be disposed at a top portion of the case 10. The discharge grill 15 may form at least a portion of the discharge port 12. The discharge grill 15 may have an annular shape.

The humidifier 1 may include a first outer case 16. The first outer case 16 may have a cylindrical shape. The suction grill 14 may be removed from the first outer case 16. The first outer case 16 may form the exterior of the case 10.

The humidifier 1 may include a first inner case 17. The first inner case 17 may have a cylindrical shape. The first inner case 17 may be disposed radially inside of the first outer case 16. The first outer case 16 and the first inner case 17 may be radially spaced apart from each other.

The humidifier 1 may include a second outer case 19. The second outer case 19 may have a cylindrical shape. The second outer case 19 may be disposed on top of the first outer case 16. The second outer case 19 may form the exterior of the case 10.

The humidifier 1 may include a second inner case 18. The second inner case 18 may have a cylindrical shape. The second inner case 18 may be disposed on top of the first inner case 17. The second inner case 18 may be disposed radially inside of the second outer case 19. The second outer case 19 and the second inner case 18 may be radially spaced apart from each other.

The first outer case 16 and the second outer case 19 may be removably coupled to each other. However, the first outer case 16 and the second outer case 19 may be integrally formed with each other. The first outer case 16 and the second outer case 19 may be referred to as an "outer case."

The first inner case 17 and the second inner case 18 may be removably coupled to each other. However, the first inner case 17 and the second inner case 18 may be integrally formed with each other. The first inner case 17 and the second inner case 18 may be referred to as an "inner case."

The humidifier 1 may include a bucket 21. The bucket 21 may have a cylindrical shape with an open top. The bucket 21 may have a space formed therein for storing water.

The humidifier 1 may include a bucket housing 22. The bucket housing 22 may surround the bucket 21. The bucket housing 22 may have a cylindrical shape with an open top. The bucket 21 may be disposed in the bucket housing 22.

The humidifier 1 may include a bucket cover 23. The bucket cover 23 may be disposed on top of the bucket 21. The bucket cover 23 may be removably coupled to the discharge grill 15.

As used herein, the water tank 20 may include the bucket 21, the bucket housing 22, and the bucket cover 23. The water tank 20 may be disposed inside the inner case 18. The water tank 20 and the inner case 18 may be radially spaced apart from each other.

Figure 3:
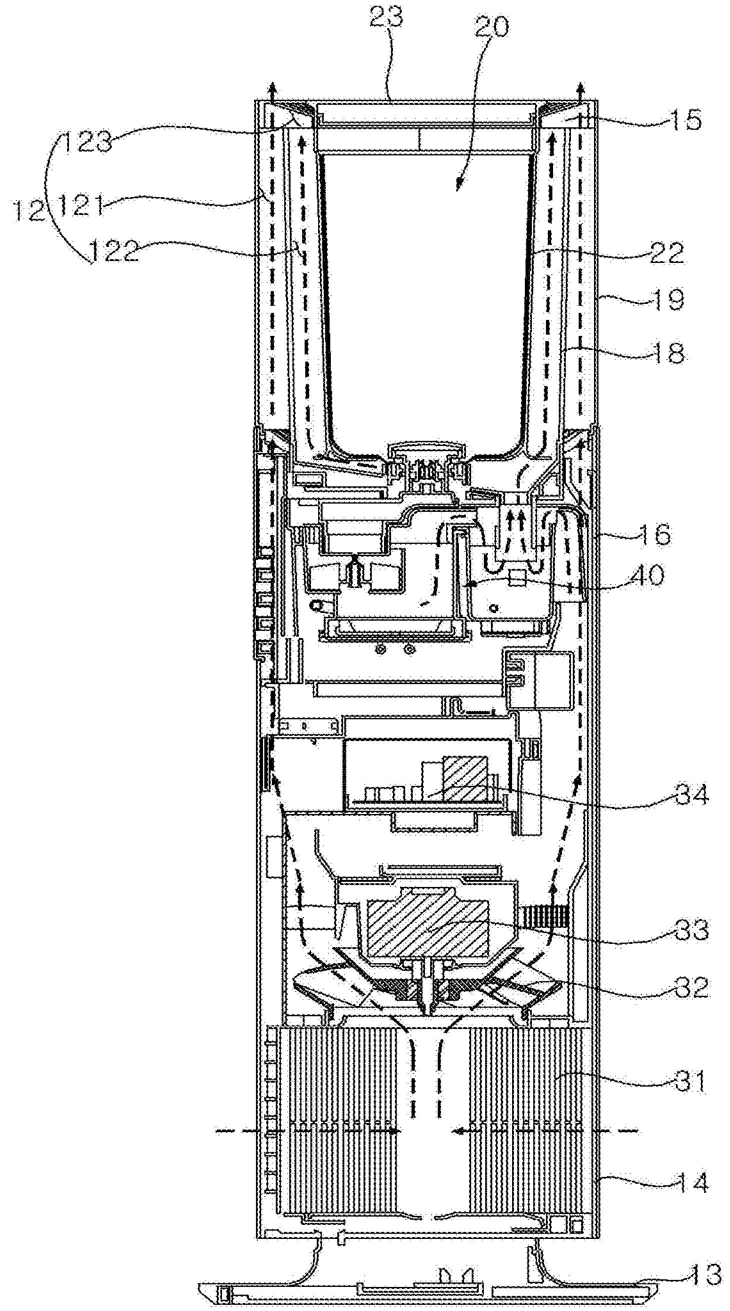
FIG. 3 is a cross-sectional view of a humidifier according to an embodiment.

Referring to FIG. 3, aspects of the humidifier 1 will be described. FIG. 3 is a vertical cross-sectional view of the humidifier 1. The humidifier 1 may include a filter 31 provided at suction port 11. For example, the filter 31 may be disposed in or along an inner surface of the suction grill 14. The filter 31 may have a cylindrical or other shape corresponding to the suction grill.

The humidifier 1 may include blower including a fan (or impeller) 32. The fan 32 may be disposed above the filter 31. The fan 32 may be disposed in the suction grill 14.

The humidifier 1 may include a fan motor 33. The fan motor 33 may rotate the fan 32. In one example, the fan motor 33 may be disposed above the fan 32.

The humidifier 1 may include a controller 34. The controller 34 may be disposed in the case 10. The controller 34 may be disposed between the fan motor 33 and a humidifying assembly 40. The controller 34 may control driving of the fan motor 33 and the humidifying assembly 40. The controller 34 may include one or more processors. The controller 34 may include one or more printed circuit boards (PCBs). In another example, the controller 34 may be provided in separate device, such as a computing or user device coupled to the humidifier through a wired or wireless connection.

The humidifier 1 may include the humidifying assembly 40. The humidifying assembly 40 may be disposed in the case 10. The humidifying assembly 40 may be disposed between the water tank 20 and the fan 32. The humidifying assembly 40 may atomize or otherwise vaporize water supplied from the water tank 20 and output the atomized water through the discharge port 12. A portion of air blown by the fan 32 may be introduced into the humidifying assembly 40 to carry the atomized water.

The discharge grill 15 may be disposed radially between the water tank 20 and the outer case 19. The inner case 18 may be disposed between the water tank 20 and the outer case 19. The discharge grill 15 may be disposed at the top of the inner case 18.

Figure 18:
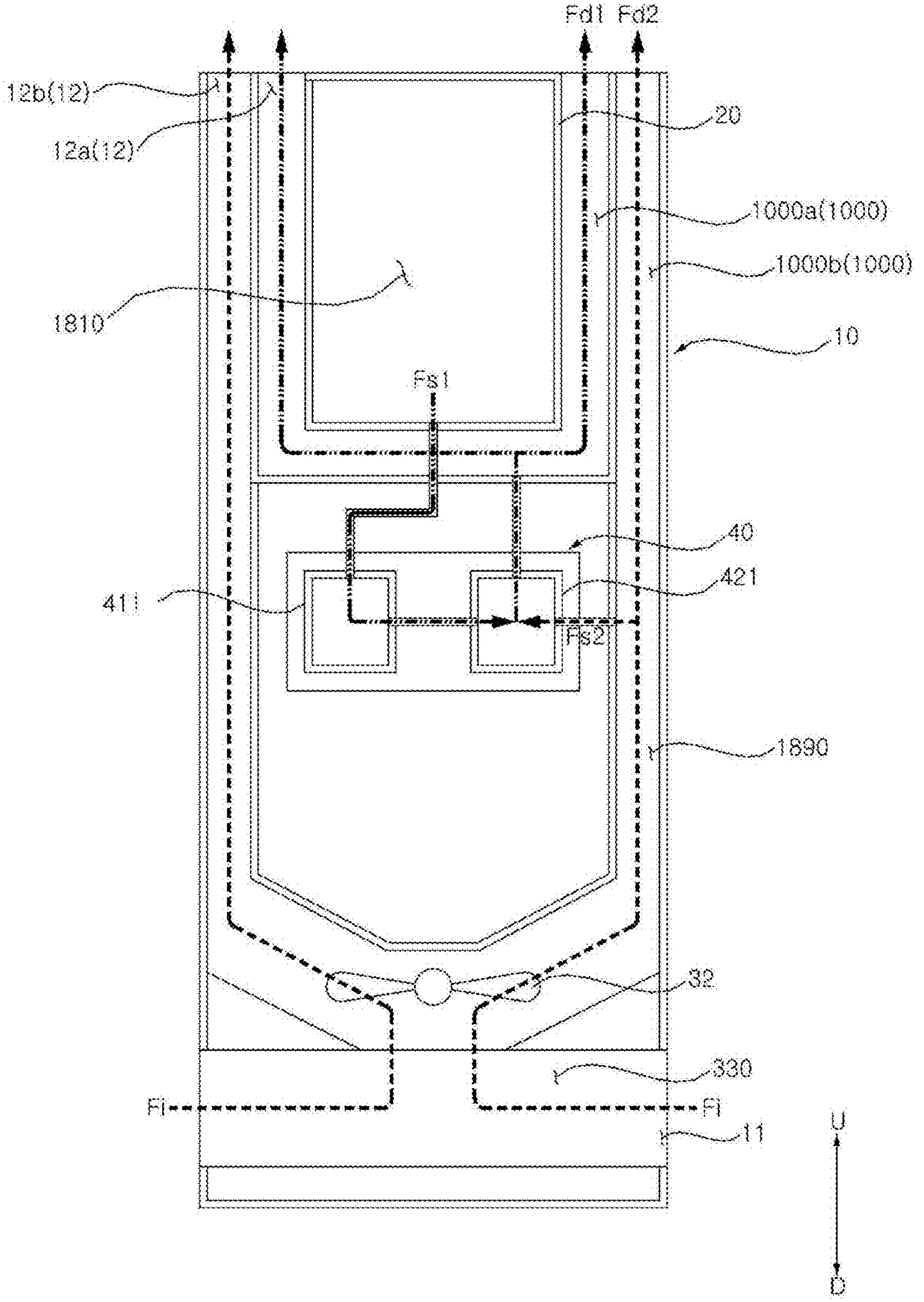
FIG. 18 is a schematic view of a humidifier according to an embodiment.

The discharge port 12 may include a first discharge port (or air passage) 121 or 12*b* (see FIG. 18). The first discharge port 121 may be formed between the outer case 19 and the inner case 18. At least a portion of the air blown by the fan 32 may flow upward through the first discharge port 121. The first discharge port 121 may extend annularly. The first discharge port 121 may be referred to as a "air-blowing passage." In addition, the first discharge port 121 may include or be coupled to a first discharge passage 1000*b* (see FIG. 18).

The discharge port 12 may include a second discharge port (or humidification passage) 122 or 12*a* (see FIG. 18). The second discharge port 122 may be formed between the inner case 18 and the water tank 20. Humidified air, having passed through the humidifying assembly 40, may flow upward through the second discharge port 122. The second discharge port 122 may extend annularly. The second discharge port 122 may be referred to as a "humidification passage." In addition, the second discharge port 122 may include or be coupled to a second discharge passage 1000*a* (see FIG. 18).

The discharge port 12 may include a combined outlet 123. The combined outlet 123 may be formed at the top of the first discharge port 121 and the second discharge port 122. The combined outlet 123 may be formed in the discharge grill 15. The combined outlet 123 may extend annularly. The combined outlet 123 may be formed between the outer case 19 and the bucket cover 23. Air flowing to the first discharge port 121 and air flowing to the second discharge port 122 may be mixed at the combined outlet 123.

The discharge port 12 may conceptually include the first discharge port 121, the second discharge port 122, and the combined outlet 123. Additionally, the discharge port 12 may refer to a space which is open toward the outside of the case 10, and which is separate from the above components 121, 122, and 123. The discharge port 12 may be open toward the top of the case 10. The discharge port 12 may be formed in the discharge grill 15. The discharge port 12 may be formed to surround the water tank 20. The air blown by the fan 32 and humidity from humidifying assembly 40 may flow through the discharge port 12.

The air-blowing passage 121 may be connected to the discharge port 12. A humidification passage 122 may be connected to the discharge port 12. The air in the air-blowing passage 121 and the air in the humidification passage 122 may be mixed at the discharge port 12.

The air introduced into the case 10 through the suction grill 14 may pass through the filter 31 to be blown upward by the fan 32. A portion of the filtered air blown upward by the fan 32 may be introduced into the humidifying assembly 40, and a remaining portion of the air may flow upward through the first discharge port 121. The air introduced into the humidifying assembly 40 may flow upward through the second discharge port 122 to transport the atomized water droplets. The air flowing through the first discharge port 121 and the humidified air flowing through the second discharge port 122 may join at the combined outlet 123 to be discharged upward or other desired direction from the humidifier 1.

Figure 4:
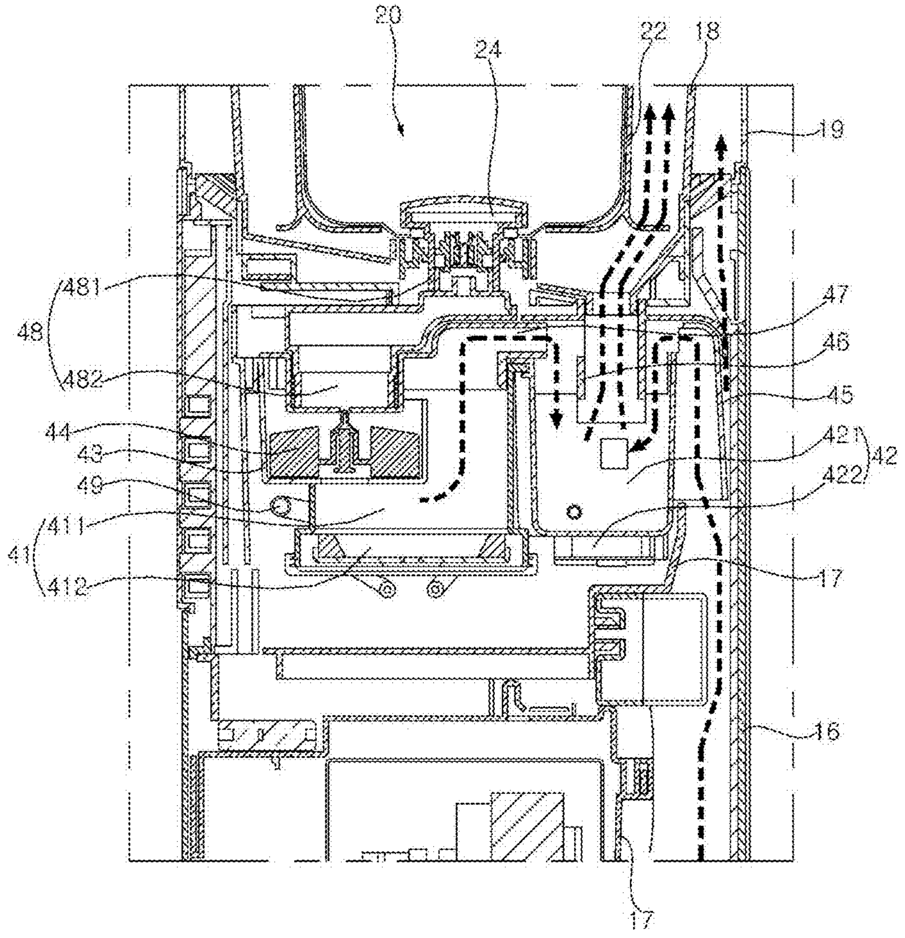
FIG. 4 is an enlarged cross-sectional view of a humidifier according to an embodiment.

Referring to FIG. 4, aspects of the humidifier 1 will be described below. FIG. 4 is a vertical cross-sectional view of a portion of the humidifier 1.

The humidifier 1 may include the humidifying assembly 40. The humidifying assembly 40 may be disposed below the water tank 20. The humidified air generated in the humidifying assembly 40 may be discharged upwards.

The humidifying assembly 40 may include a heating device 41. The heating device 41 may heat water and/or air introduced into the heating device 41.

The heating device 41 may include a heating chamber (or heating housing) 411. The heating chamber 411 may have an internal space. The water contained in the water tank 20 may be introduced into the internal space of the heating chamber 411.

The heating device 41 may include a heater (or heating element) 412. The heater 412 may be coupled to a lower side or other region of the heating chamber 411. The heater 412 may apply heat to the inside of the heating chamber 411. The heater 412 may heat the water and air introduced into the heating chamber 411.

The humidifying assembly 40 may include a humidifying device 42. In one example, the humidifying device 42 may atomize the introduced water into droplets. The humidifying device 42 may change the introduced water into atomized droplets and discharge the droplets upwards. It should be appreciated that other known methods may be used to generate water droplets, such as to evaporate the water.

The humidifying device 42 may include a humidifying chamber (or humidifying housing) 421. The humidifying chamber 421 may include an internal space. In certain implementations, water heated by the heating device 41 may be introduced into the humidifying chamber 421. In other examples, unheated water may be introduced into the internal space of the humidifying chamber 421.

The humidifying device 42 may include an ultrasonic vibrator 422. The ultrasonic vibrator 422 may be coupled to a lower side or other surface of the humidifying chamber 421. The ultrasonic vibrator 422 may generate vibrations using ultrasound. For example, ultrasonic vibrator 422 may be a sonic transducer, such as a piezoelectric transducer, to create a high frequency (e.g., 1-2 MHz) mechanical oscillation in a film of water to form fine mist of droplets (e.g., water of about one micron in diameter). By driving the ultrasonic vibrator 422, the water in the humidifying chamber 421 may be atomized into droplets. Other known principles of ultrasonic humidifiers may also be applied to the humidifying device 42.

The humidifying assembly 40 may include a valve housing 43. The valve housing 43 may be coupled to the heating device 41. The valve housing 43 may be disposed in or adjacent to the heating chamber 411. For example, valve housing 43 may be provided in a water flow path to or from the heating chamber.

The humidifying assembly 40 may include a valve 44 to control a flow of water through the valve housing 43. The valve 44 may be a floating valve, and the valve 44 may be movably disposed in the valve housing 43. For example, the valve 44 may move up and down in the valve housing 43 to selectively supply water into the heating chamber 41.

The humidifying assembly 40 may include an inlet 45. The inlet 45 may be connected to the humidifying device 42. The inlet 45 may be connected to the inside of the humidifying chamber 421. Air may flow into the humidifying chamber 421 through the inlet 45. For example, a portion of the air blown by the fan 32 (see FIG. 3) may be introduced into the humidifying chamber 421 through the inlet 45.

The humidifying assembly 40 may include an outlet 46. The outlet 46 may be connected to the humidifying device 42. The outlet 46 may project toward the inside of the humidifying chamber 421. The atomized water droplets generated in the humidifying device 42 may by carried in an outward air current to flow out of humidifying device 42 and upward through the outlet 46.

The humidifying assembly 40 may include a connector (or conduit) 47. The connector 47 may connect the heating device 41 and the humidifying device 42. The connector 47 may connect the heating chamber 411 and humidifying chamber 421, such as to allow steam from the heating chamber 411 to flow into the humidifying chamber 421. The connector 47 may face a portion of the outlet 46.

The humidifying assembly 40 may include a supply port 48. The supply port 48 may connect the water tank 20 and the heating device 41. Water in the water tank 20 may be introduced into the heating device 41 through the supply port 48. For example, water in bucket housing 22 may flow through supply port 48 and through the valve housing 43 to be introduced into the heating chamber 411 when valve 44 is in an opened position.

The supply port 48 may include a first (or upper) supply port 481. The first supply port 481 may be connected to the water tank 20. For example, the first supply port 481 may be connected to the lower side of the bucket housing 22.

The water tank 20 may include a discharge port 24. The discharge port 24 may be formed at a lower portion of the water tank 20, such as being provided a lower surface of bucket housing 22. The discharge port 24 may be connected to the first supply port 481 so that water from water tank 20 may flow through the discharge port 25 and into the first supply port 481.

The supply port 48 may include a second (or lower) supply port 482. The second supply port 482 may connect the first supply port 481 and the valve housing 43. Water introduced into the first supply port 481 may subsequently be introduced into the valve housing 43 through the second supply port 482.

The humidifying assembly 40 may include a connection pipe 49. The connection pipe 49 may connect the heating device 41 and the humidifying device 42. The connection pipe 49 may connect the heating chamber 411 and the humidifying chamber 421. For example, heated water in the heating chamber 411 may be introduced into the humidifying chamber 421 through the connection pipe 49.

A portion of air flowing between the outer case 16 and the inner case 17 (e.g., air from fan 32) may be introduced into the humidifying device 42 through the inlet 45. The air introduced into the humidifying device 42 may flow upward through the outlet 46 while containing the water droplets generated in the humidifying device 42. The air flowing upward through the outlet 46 may flow upward in an air flow path between the water tank 20 and the inner case 18.

In summary, the water in the water tank 20 may be introduced into the valve housing 43 through the supply port 48. The water in the valve housing 43 may then be introduced into the heating device 41 by movement of the valve 44, and the water introduced into the heating device 41 may be heated by the heater 412. The water heated in the heating chamber 411 may then be introduced into the humidifying chamber 421 through the connection pipe 49. Subsequently, the water introduced into the humidifying chamber 421 may be atomized into droplets by the ultrasonic vibrator 422. Next, the atomized water droplets may flow upward through the outlet 46 along with the air introduced through the inlet 45.

Figure 5:
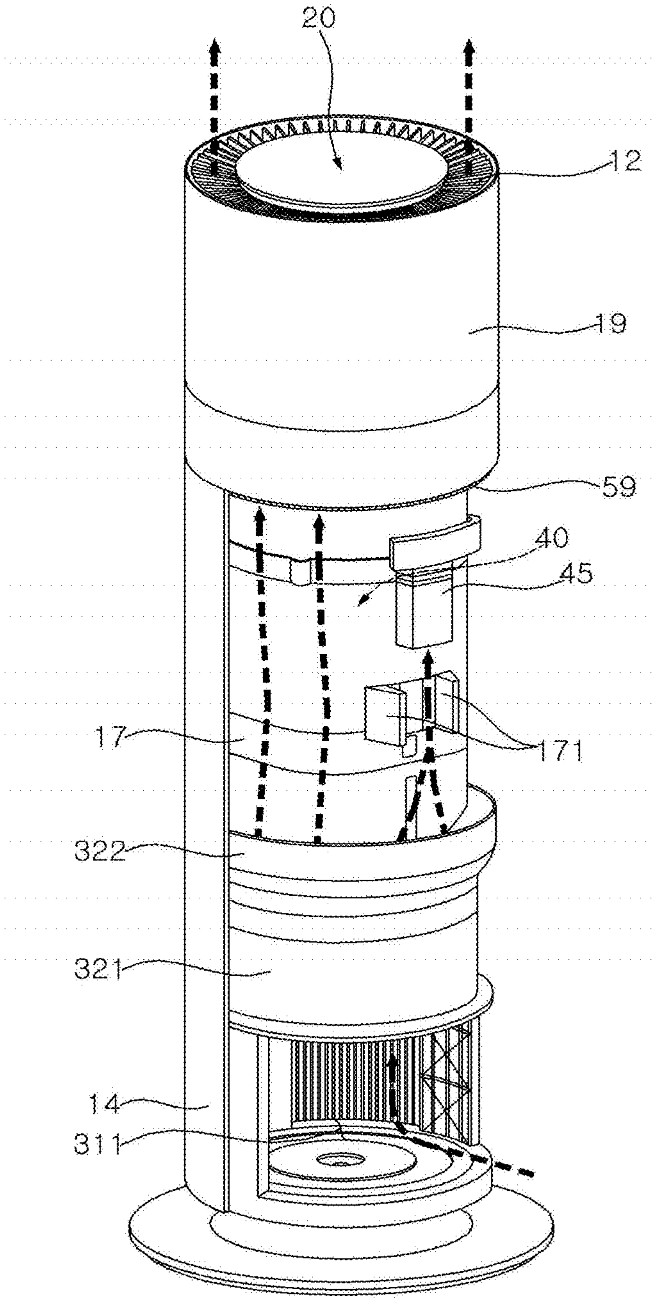
FIG. 5 is a diagram illustrating a portion of a humidifier according to an embodiment.

Referring to FIG. 5, aspects of the humidifier 1 will be described below. FIG. 5 is a diagram illustrating the humidifier 1 from which the first outer case 16 is separated.

The humidifier 1 may include a filter mounting space 311. The filter mounting space 311 may be formed in the suction grill 14. The filter 31 (see FIG. 3) may be disposed in the filter mounting space 311. For example, the filter 31 may remove dust other contaminants from introduced air before being supplied to the humidifying device 42 through inlet 45. The air introduced through the suction grille 14 may pass through the filter mounting space 311 to flow upwards.

The humidifier 1 may include a fan housing 321. The fan 32 (see FIG. 3) may be disposed in the fan housing 321. The fan housing 321 may be disposed on top of the filter 31 (see FIG. 3). Air, after passing through the filter 31, may be suctioned into the fan housing 321 by the fan 32 through openings in a lower surface of the fan housing 321.

The humidifier 1 may include a housing top portion (or upper fan housing portion) 322. The housing top portion 322 may form a top portion of the fan housing 321. The housing top portion 322 may be radially outwardly spaced apart from the inner case 17 to guide air outputted from the fan housing 321. The air blown by the fan 32 (see FIG. 3) may flow upward through a space formed between the inner case 17 and the housing top 322.

The humidifier 1 may include a guide 171. The guide 171 may protrude radially outward or other direction from the inner case 17. The guide 171 may be disposed between the inlet 45 and the fan housing 321. A plurality of guides 171 may be arranged so as to be spaced apart in a circumferential direction of the inner case 17. A space between the plurality of guides 171 may be provided below and may vertically face the inlet 45. The space between the plurality of guides 171 may be provided above and may vertically face the housing top portion 322.

The humidifier 1 may include an inner grill 59. The inner grill 59 may be disposed above the humidifying assembly 40. The inner grill 59 may be disposed radially outside of the inner case 17. For example, a portion of air blown upwards by fan 32 and not received in inlet 45 may pass through the inner grill 59. The inner grill 59 may be coupled to the outer case 19.

A first portion of the air blown by the fan 32 (see FIG. 3) may be introduced into the inlet 45. The first portion of the air blown by the fan 32 may be introduced into the inlet 45 after being guided through the space between the plurality of guides 171. As previously described, the air introduced into the humidifying assembly 40 through the inlet 45 may be subsequently discharged from the humidifying assembly 40 through the discharge port 12 while transporting atomized water droplets, such as through humidification passage 122.

In certain examples, a supporter may be fixed to the inlet 45. The supporter may connect a secondary fan device and the inlet 45. For example, inlet 45 may generate a supplemental air flow to increase air flow into humidifying assembly 40, or air from fan 32 may bypass humidifying assembly 40 with air flow within humidifying assembly 40 being entirely generated by inlet 45.

A second, remaining portion of air blown by the fan 32 that is not received within inlet 45 may flow upward through a space between the outer case 16 (see FIG. 3) and the inner case 17 to pass through the inner grill 59. The air having passed through the inner grill 59 may flow upward to be discharged through the discharge port 12, such as through the air-blowing passage 121.

Figure 6:
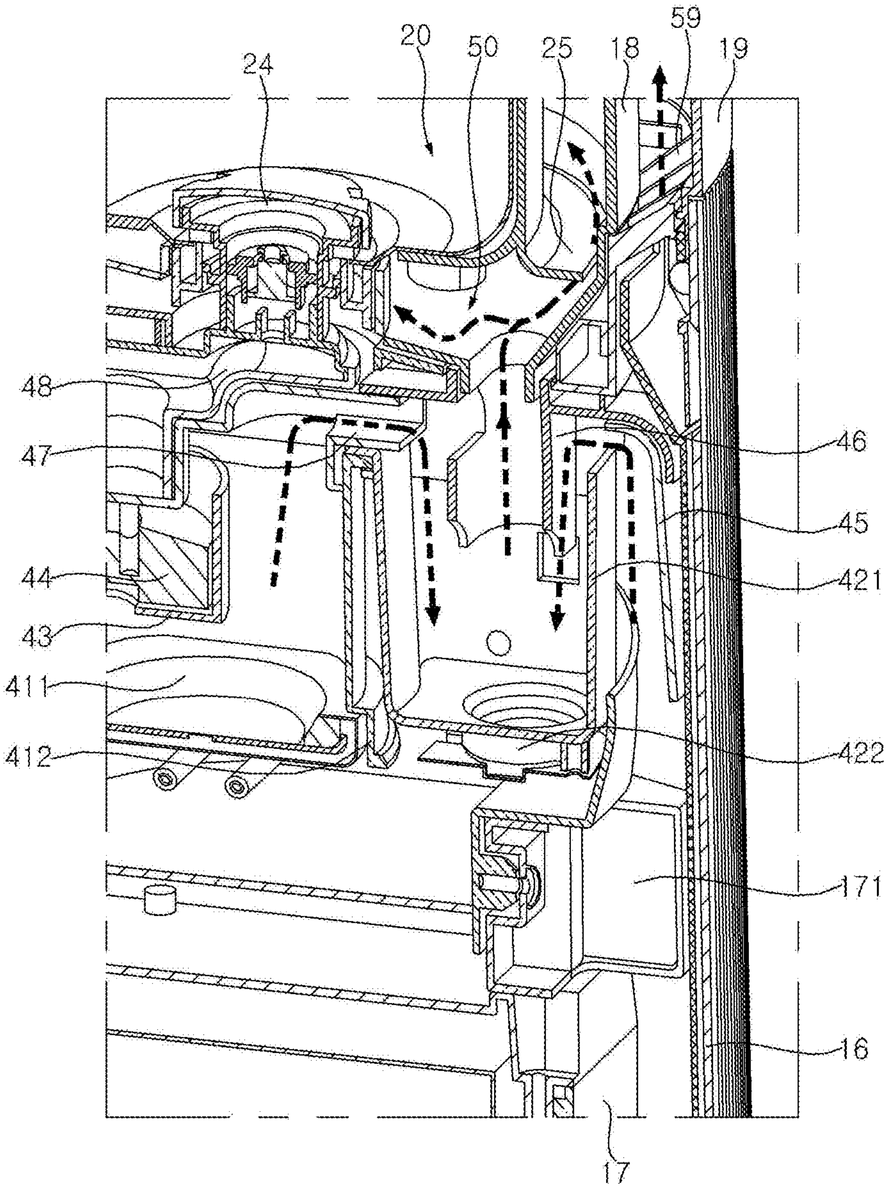
FIG. 6 is a cutaway view of a portion of a humidifier according to an embodiment.

Referring to FIG. 6, aspects of the humidifier 1 will be described below. FIG. 6 is an oblique, vertical cutaway view of a portion of the humidifier 1.

As previously described, a portion of air flowing upward between the outer case 16 and the inner case 17 may be introduced into the inlet 45. The guide 171 may be provided below and vertically face the inlet 45.

The air introduced into the humidifying chamber 421 through the inlet 45 may be mixed with the water droplets generated by driving the ultrasonic vibrator 422. The humidified air, mixed with the water droplets, may then flow upward through the outlet 46.

The humidifying chamber 421 may communicate with the heating chamber 411. For example, the connector 47 provided at upper regions of humidifying chamber 421 and the heating chamber 411 may connect the humidifying chamber 421 and the heating chamber 411. As previously described, the connection pipe 49 may also connect the heating chamber 411 and the humidifying chamber 421, and the connection pipe 49 may be provided below the connector 47 to allow heated water from the heating chamber 411 to flow into the humidifying chamber 421.

The air in the heating chamber 411 may be mixed with the air introduced into the humidifying chamber 421 to be discharged through the outlet 46. A portion of water introduced into the heating chamber 411 may be evaporated to be introduced in the form of water vapor into the humidifying chamber 421. The water vapor generated in the heating chamber 411 may be mixed with the air carrying atomized water in the humidifying chamber 421 to be discharged through the outlet 46.

The air flowing upward from the humidifying chamber 421 through the outlet 46 may be introduced between the water tank 20 and the inner case 18. For example, the humidified air discharged through the outlet 46 may flow upward between the water tank 20 and the inner case 18.

The humidifier 1 may include an inner cover 50. The inner cover 50 may be connected to the outlet 46. For example, the inner cover 50 may be a portion of the water tank 20. The inner cover 50 may be disposed between the water tank 20 and the humidifying assembly 40. The air flowing through the outlet 46 may flow upward from the inner cover 50.

The water tank 20 may include a guide rim 25. The guide rim 25 may extend annularly along the circumference of the water tank 20. The guide rim 25 may be spaced above the outlet 46. The air flowing through the outlet 46 may be diffused or otherwise redirected by the guide rim 25 in a circumferential direction of the water tank 20. The humidified air diffused in the circumferential direction of the water tank 20 may flow upward between the water tank 20 and the inner case 18.

At least a portion of the air flowing between the outer case 16 and the inner case 17 may flow upward through the inner grill 59. The inner grill 59 may be disposed between the outer case 19 and the inner case 18. The air having passed through the inner grill 59 may flow upward between the outer case 19 and the inner case 18 and toward the discharge port 12.

Figure 7:
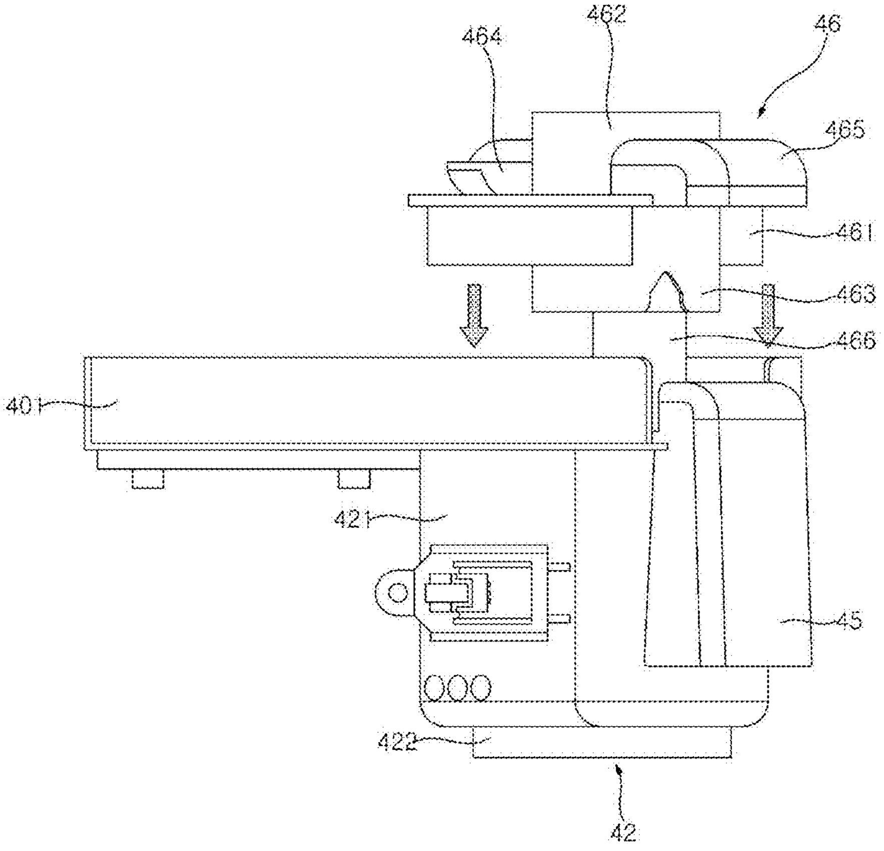
FIG. 7 is a diagram illustrating a portion of a humidifier according to an embodiment.

Referring to FIG. 7, aspects of the humidifier 1 will be described below. FIG. 7 is a diagram illustrating a portion of the humidifying assembly 40.

The humidifying assembly 40 may include the humidifying device 42. As previously described, the humidifying device 42 may generate mist. The humidifying device 42 may include the humidifying chamber 42 and the ultrasonic vibrator 422.

The humidifying assembly 40 may include a body (or frame) 401. The body 401 may have a cylindrical shape with an open top. The heating device 41 (see FIG. 4) and the humidifying device 42 may be coupled to the body 401. The heating device 41 (see FIG. 4) and the humidifying device 42 may be coupled to a lower side of the body 401.

The humidifying assembly 40 may include the outlet 46. The air introduced into the humidifying device 42 through the inlet 45 may flow to the outlet 46 while containing mist and water vapor from heating device 41. The outlet 46 may be coupled to the body 401. The outlet 46 may be coupled to an upper portion of the humidifying device 42.

The outlet 46 may include an outlet body 461. The outlet body 461 may be coupled to the body 401. For example, a portion of the outlet body 461 may be inserted into the humidifying chamber 421.

The outlet 46 may include a mist outlet port 462. The mist outlet port 462 may protrude upward from the outlet body 461. The mist generated in the humidifying device 42 may flow upward through the mist outlet port 462.

The outlet 46 may include a mist inlet port 463. The mist inlet port 463 may protrude downward from the outlet body 461. The mist inlet port 463 may extend toward the inside of the humidifying chamber 421. The mist generated in the humidifying device 42 may flow toward the mist outlet port 462 through the mist inlet port 463.

The outlet 4 may include a connector coupling part (or connector cover) 464. The connector coupling part 464 may extend toward the heating device 41 (see FIG. 4). The connector coupling part 464 may be coupled to the connector 47 (see FIG. 4).

The outlet 46 may include an inlet cover 465. The inlet cover 465 may be disposed above the inlet 45. The inlet cover 465 may cover an upper portion of the inlet 45.

The outlet 46 may include a supporter (or supporter wall) 466. The supporter 466 may extend downward from the outlet body 461. At least a portion of the supporter 466 may be disposed in the humidifying chamber 421. The supporter 466 may face a side wall of the humidifying chamber 421.

Figure 8:
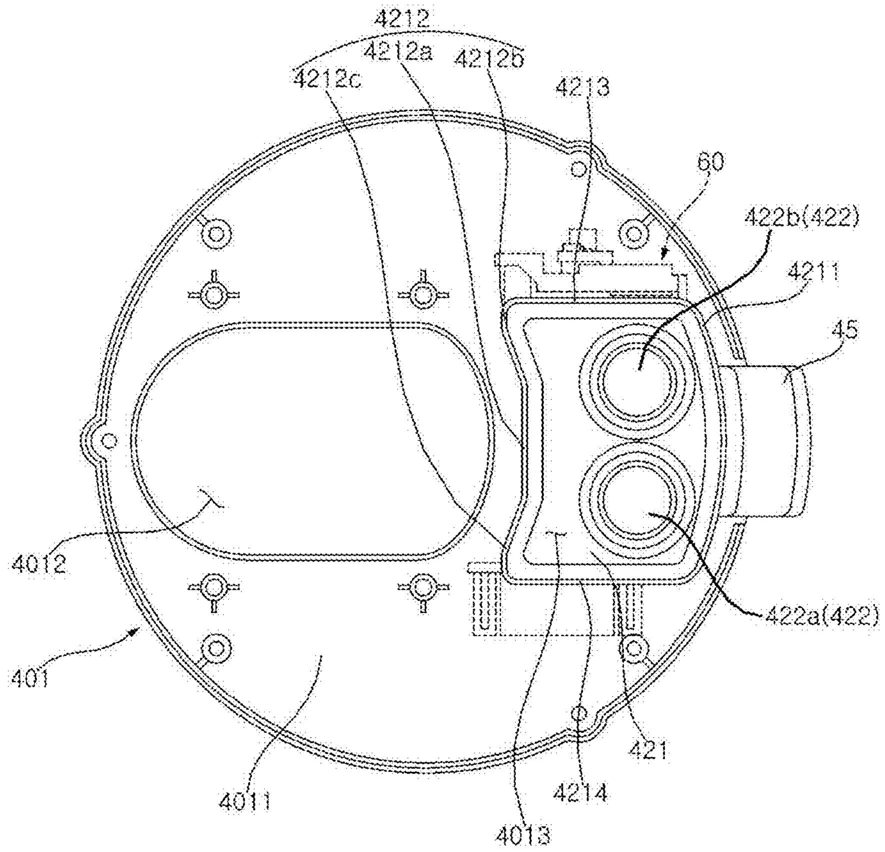
FIG. 8 is a diagram illustrating a portion of a humidifier according to an embodiment.

Referring to FIG. 8, aspects of the humidifier 1 will be described below. FIG. 8 is a diagram representation illustrating a portion of the humidifying assembly 40 in plan view.

The body 401 may include a body plate 4011. The body plate 4011 may have a substantially circular plate shape, or other shape to be received within the outer case 16. The humidifying device 42 may be coupled to the body plate 4011.

The body 401 may include a first opening 4012. The first opening 4012 may be formed in the body plate 4011. The heating device 41 (see FIG. 6) may be coupled to the first opening 4012.

The body 401 may include a second opening 4013. The second opening 4013 may be formed in the body plate 4011. The humidifying device 42 may be coupled to the second opening 4013. The outlet 46 (see FIG. 4) may be inserted into the humidifying chamber 421 through the second opening 4013.

The internal space of the humidifying chamber 421 may communicate with the second opening 4013. There may be a plurality of ultrasonic vibrators 422.

The humidifying chamber 421 may include an outer wall 4211. The outer wall 4211 may be coupled to the inlet 45.

The humidifying chamber 421 may include an inner wall 4212. The inner wall 4212 may be spaced apart from the outer wall 4211. The internal space of the humidifying chamber 421 may be formed between the outer wall 4211 and the inner wall 4212. The inner wall 4212 may be disposed between the first opening 4012 and the outer wall 4211.

The inner wall 4212 may include a wall surface portion 4212*a*. The wall surface portion 4212*a* may face the outer wall 4211. The inner wall 4212 may include a first corner portion 4212*b*. The first corner portion 4212*b* may extend outside of the wall surface portion 4212*a*. The first corner portion 4212*b* may be curved toward the center of the body 401. The inner wall 4212 may include a second corner portion 4212*c*. The second corner portion 4212*c* may extend outside of the wall surface portion 4212*a*. The second corner portion 4212*c* may be curved toward the center of the body 401. The wall surface portion 4212*a* may be disposed between the first corner portion 4212*b* and the second corner portion 4212*c*.

The humidifying chamber 421 may include a first side wall 4213. The first side wall 4213 may connect the outer wall 4211 and the inner wall 4212. The first side wall 4213 may be connected to the first corner portion 4212*b*. The humidifying chamber 421 may include a second side wall 4214. The second side wall 4214 may connect the outer wall 4211 and the inner wall 4212. The second side wall 4214 may be connected to the second corner portion 4212*c*. The first side wall 4213 and the second side wall 4214 may be spaced apart from each other. The internal space of the humidifying chamber 421 may be formed between the first side wall 4213 and the second side wall 4214.

The humidifier 1 may include a sterilizer 60. The sterilizer 60 may be disposed in the humidifying device 42. In one example, the sterilizer 60 may emit ultraviolet light toward the humidifying chamber 421. In another example, the sterilizer 60 may generate a sterilizing substance, such as ozone or ions (e.g., silver or copper ions) introduced into the humidifying chamber 421.

As previously described, the humidifier 1 may include the case 10 and the humidifying assembly 40 disposed in the case 10 and configured to generate mist. The humidifying assembly 40 may include a plurality of ultrasonic vibrators 422 disposed under the humidifying chamber 421 to improve humidification performance. In addition, by controlling each of the plurality of ultrasonic vibrators 422, the humidifying assembly 40 may adjust the direction and shape of mist, and may provide various mist modes.

The humidifying assembly 40 may include at least first and second ultrasonic vibrators 422*a* and 422*b*. Although two ultrasonic vibrators 422*a* and 422*b* are discussed herein, it should be appreciated that additional ultrasonic vibrators 422 may be provided in the humidifying assembly 40. In addition, the humidifying assembly 40 may drive both or any one of the first and second ultrasonic vibrators 422*a* and 422*b* according to a user's request and current circumstances, or by controlling the first and second ultrasonic vibrators 422*a* and 422*b* with different output values, thereby improving humidification performance and product life, adjusting the direction and shape of mist, and providing various mist modes.

As described above with reference to FIGS. 1 to 8, the humidifying assembly 40 may include the inlet 45 through which air is introduced into the humidifying chamber 421, and the outlet 46 through which mist generated in the humidifying chamber 421 is discharged, and the first and second ultrasonic vibrators 422*a* and 422*b* may be spaced apart from each other at the lower side of the outlet 46. Particularly, the outlet 46 may protrude toward the inside of the humidifying chamber 421, and the first and second ultrasonic vibrators 422*a* and 422*b* may be disposed on a lower side in a protruding or extension direction of the outlet 46.

In addition, the humidifying assembly 40 may further include the heating device 41 for heating the introduced water and air, and the heating device 41 may communicate with the humidifying chamber 421. The humidifying chamber 421 may communicate with the heating chamber 411 into which the water contained in the water tank 20 is introduced, and the water heated by the heating device 41 may be introduced into the humidifying chamber 421. Accordingly, heated water and water vapor may be provided into the humidifying chamber 421 to clean the humidifying chamber 421 and increase the humidity of air therein.

In addition, the humidifier 1 may include the suction port 11 through which air is introduced into the case 10, the fan 32 disposed in the case 10, the discharge port 12 through which the air introduced into the case through the suction port 11 flows out of the case 10, the air-blowing passage 121 through which air blown by the fan 32 flows and which extends toward the discharge port 12, and the humidification passage 122 which connects the humidifying assembly 40 and the discharge port 12 and which is separated from the air-blowing passage 121.

The air introduced into the case 10 may pass through the filter 31 to be blown upward by the fan 32. A portion of the air blown upward by the fan 32 may be introduced into the humidifying assembly 40, and a remaining portion thereof may flow upward through the first discharge port 121. The air introduced into the humidifying assembly 40 may flow upward through the second discharge port 122 while containing atomized water droplets. The air flowing through the first discharge port 121 and the humidified air flowing toward the second discharge port 122 may be mixed to be discharged upward from the humidifier 1. Accordingly, the humidified air generated in the heating chamber 411 and the humidified air generated in the humidifying chamber 421 may be discharged together, such that pleasant, humidified air may be provided. Meanwhile, the humidifying assembly 40 may drive any one of the first and second ultrasonic vibrators 422*a* and 422*b*, or may drive the first and second ultrasonic vibrators 422*a* and 422*b* with different driving signals.

Figure 9:
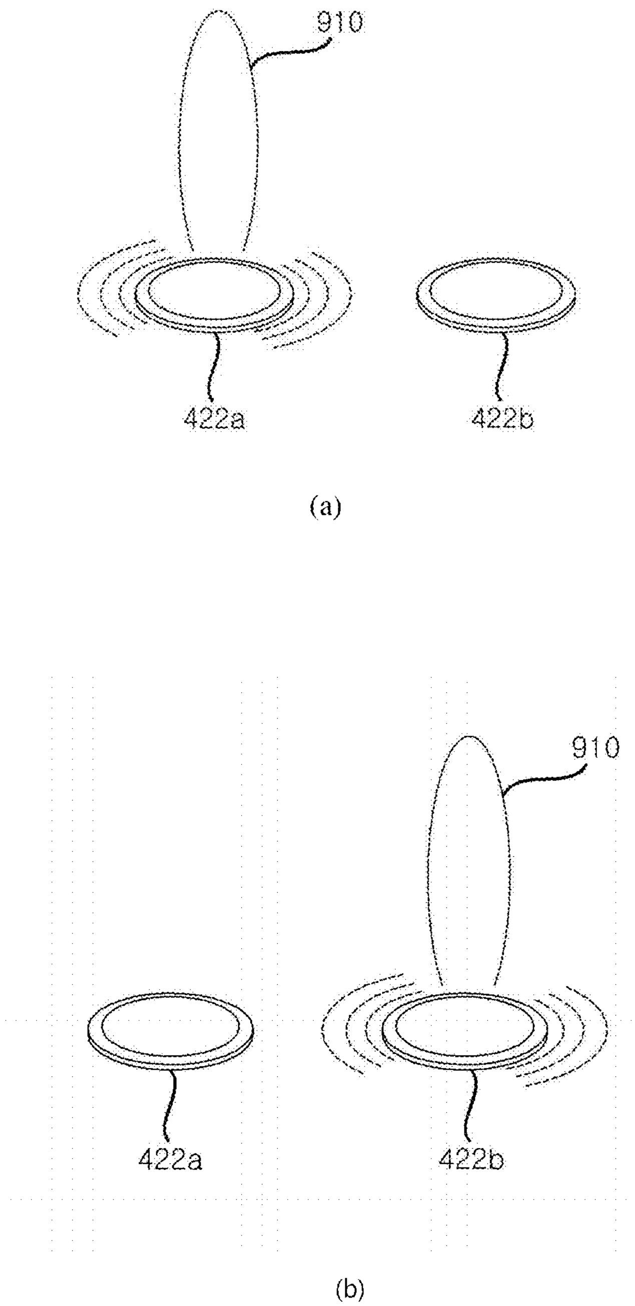
FIG. 9 is a diagram illustrating control of vibrators in a humidifier according to an embodiment.

FIG. 9 is a diagram referred to in the description of alternating control of vibrators according to an embodiment, in the case where one of the first and second ultrasonic vibrators 422*a* and 422*b* is driven. Referring to (a) of FIG. 9, by driving only the first ultrasonic vibrator 422*a* of the first and second ultrasonic vibrators 422*a* and 422*b*, mist 910 in the form of a water column may be generated above the first ultrasonic vibrator 422*a*. Further, referring to (b) of FIG. 9, by driving only the second ultrasonic vibrator 422*b* of the first and second ultrasonic vibrators 422*a* and 422*b*, mist 910 in the form of a water column may be generated above the second ultrasonic vibrator 422*b*. Thus, separately driving one of the first and second ultrasonic vibrators 422*a* and 422*b* may allow columns of mists to generated selectively in different sections of the humidifying chamber 421, thereby allowing better control of an amount and location of atomized water droplet generation.

Figure 10:
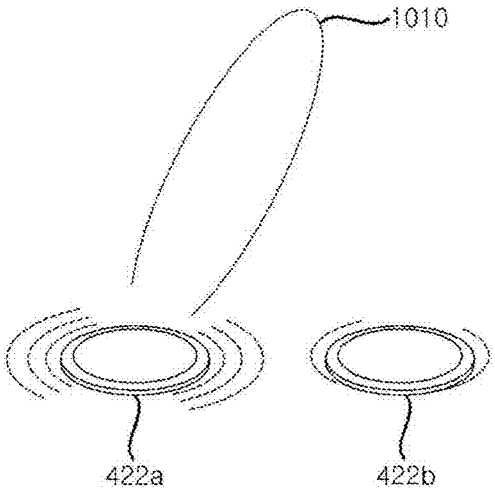
FIG. 10 is a diagram illustrating control of the direction of mist outputted by a vibrator in a humidifier according to an embodiment.
Figure 10:
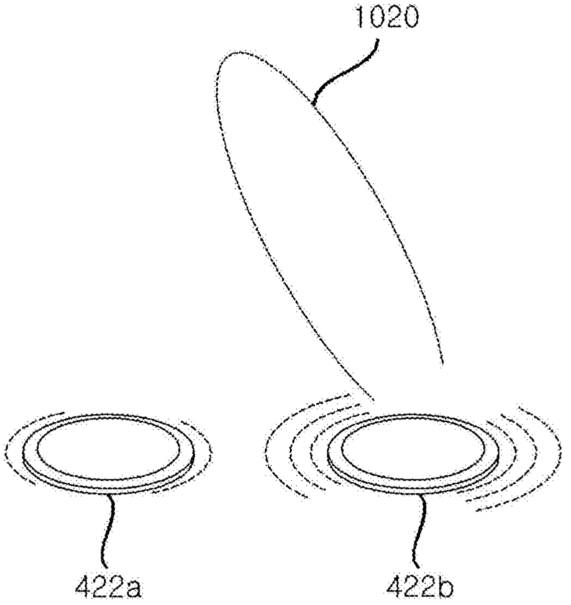

FIG. 10 is a diagram referred to in the description of controlling the direction of mist according to an embodiment, in which the shape of mist is changed by driving the first and second ultrasonic vibrators 422*a* and 422*b* by different driving signals (output values). Referring to region (a) of FIG. 10, the first ultrasonic vibrator 422*a* may operate in response to a driving signal corresponding to a "large" amount of mist (e.g., a first driving signal providing a first, relatively larger amount of power to the first ultrasonic vibrator 422*a*), and the second ultrasonic vibrator 422*b* operates in response to a driving signal corresponding to a "small" amount of mist (e.g., a second driving signal providing a second, relatively smaller amount of power to the second ultrasonic vibrator 422*a*). In addition, referring to region (b) of FIG. 10, the first ultrasonic vibrator 422*a* may operate in response to a driving signal corresponding to a "small" amount of mist, and the second ultrasonic vibrator 422*b* operates in response to a driving signal corresponding to a "large" amount of mist. For example, the humidifying assembly 40 may control the amount of mist by adjusting at least one of a current or a voltage supplied to the first and second ultrasonic vibrators 422*a* and 422*b*.

According to an embodiment of the present disclosure, by adjusting duty ratios of pulse width modulation (PWM) driving signals supplied to the first and second ultrasonic vibrators 422*a* and 422*b*, the current supplied to the first and second ultrasonic vibrators 422*a* and 422*b* may be changed to control the amount of mist. If a duty ratio of the PWM driving signal for driving the first ultrasonic vibrator 422*a* is different from a duty ratio of the PWM driving signal for driving the second ultrasonic vibrator 422*b*, the first and second ultrasonic vibrators 422*a* and 422*b* may operate to output relatively different amounts of mist.

In another example, the humidifying assembly 40 may form various shapes of mist by individually adjusting the duty ratios of the PWM driving signals for driving the first ultrasonic vibrator 422*a* and the second ultrasonic vibrator 422*b*. For example, a higher PWM driving signal may cause one of the first and second ultrasonic vibrators 422*a* and 422*b* to output a relatively greater amount of mist, and a lower PWM driving signal may cause one of the first and second ultrasonic vibrators 422*a* and 422*b* to output a relatively smaller amount of mist.

Alternatively, in a another mode, the humidifying assembly 40 may change variable resistor values differently so that a value of a variable resistor, connected to or included in the first ultrasonic vibrator 422*a*, may be different from a value of a variable resistor connected to or included in the second ultrasonic vibrator 422*b*. Thus, corresponding driving signals may be provided to the first ultrasonic vibrator 422*a* and the second ultrasonic vibrator 422*b*, but resulting currents supplied, respectively, to the first and second ultrasonic vibrators 422*a* and 422*b* may be controlled by adjusting the variable resistances of the first and second ultrasonic vibrators 422*a* and 422*b* control the amounts of generated mist.

In certain examples, the overall shape of mists 1010 and 1020 may be inclined from a side where a mist amount is set to high toward a side where a mist amount is set to low. Referring to region (a) of FIG. 10, the mist 1010 may be in the form of a water column that is inclined from above the first ultrasonic vibrator 422*a* toward the second ultrasonic vibrator 422*b*. In addition, referring to region (b) of FIG. 10, the mist 1020 may be in the form of a water column that is inclined from above the second ultrasonic vibrator 422*b* toward the first ultrasonic vibrator 422*a*.

Various mist directions and mist modes may be provided by using the first and second ultrasonic vibrators 422*a* and 422*b* based on combinations of different driving signals (output values) and patterns. In addition, turning off some of the ultrasonic vibrators may be used as one of the combinations, thereby providing various mist directions and mist modes.

According to an embodiment of the present disclosure, the first and second ultrasonic vibrators 422*a* and 422*b* may be alternately controlled. For example, after first controlling the first ultrasonic vibrator 422*a* to be turned on and the second ultrasonic vibrator 422*b* to be turned off during a first time period, the first ultrasonic vibrator 422*a* may be controlled to be turned off and the second ultrasonic vibrator 422*b* may be controlled to be turned on during a second time period, and then, the first ultrasonic vibrator 422*a* may be controlled to be turned on again and the second ultrasonic vibrator 422*b* may be turned off again during a third time period. This process of alternatively driving the first and second ultrasonic vibrators 422*a* and 422*b* may continue.

In addition, according to an embodiment of the present disclosure, the first and second ultrasonic vibrators 422*a* and 422*b* may be alternately controlled to be alternately driven according to a predetermined cycle. Physical properties of manufactured ultrasonic vibrators are not exactly the same, such that a deviation, although small, occurs. Accordingly, if an alternating control period is too short, the shape and amount of mist changes too frequently, causing users inconvenience and degrading the perceived quality. In many cases, users clean the interior of the humidifier 1 after use for a particular time period (e.g., about one week). Accordingly, by setting the alternating control period to corresponding to the particular time period for servicing and cleaning of humidifier 1 (e.g., a one-week period), it may be possible to prevent too frequent changes and to alternately operate the ultrasonic vibrators smoothly when entering a resting state.

After being driven, one of the ultrasonic vibrators 422 may be allowed to rest in an off state for a predetermined period of time (e.g., about a week), which may be helpful in improving service life characteristics. Accordingly, by driving the two ultrasonic vibrators 422*a* and 422*b* alternately one by one, a resting period may be secured, and service life characteristics may be improved. Furthermore, even if a user neglects cleaning of humidifier after the predetermined period of time, driving the two ultrasonic vibrators 422*a* and 422*b* alternately one by one helps to prevent excessively operating each of the two ultrasonic vibrators 422*a* and 422*b* for too long while the humidifier 1 is in an uncleaned state, thereby improving reliability and longevity of humidifier 1. Additionally, by using the plurality of ultrasonic vibrators 422*a* and 422*b*, when one of the ultrasonic vibrators 422*a* and 422*b* malfunctions, the humidifier 1 may operate normally using the remaining at least one ultrasonic vibrator 422*a* and 422*b* that is in a normal state without failure, thereby improving the overall product life of the humidifier 1.

Figure 11:
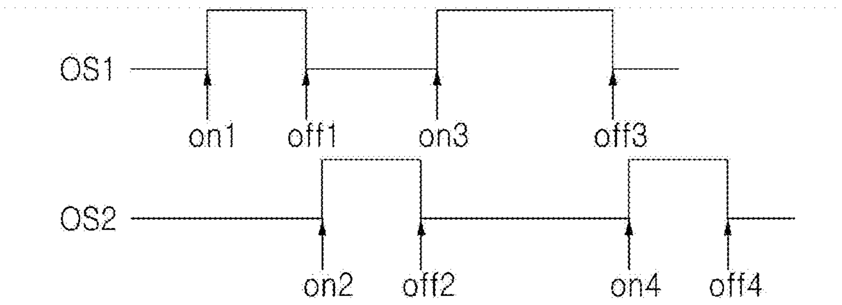
FIGS. 11 to 15 are diagrams related to operation of first and second vibrators in a humidifier according to various embodiments.

FIGS. 11 to 15 are diagrams referred to in the description of operation of first and second vibrators according to various embodiments. According to an embodiment of the present disclosure, every time a humidifying operation is turned on or the humidifier 1 is turned on, the humidifying assembly 40 may alternatively drive a different one of the two ultrasonic vibrators OS1 (422*a*) and OS2 (422*b*). Referring to FIG. 11, in a first round of humidifying operation, the first ultrasonic vibrator OS1 422*a* may be turned on (on1) and then may be turned off (off1), and the second ultrasonic vibrator OS2 422*b* may remain in an off state during the first round. In a second round of humidifying operation, the second ultrasonic vibrator OS2 422*b* may be turned on (on2) and then may be turned off (off2), and the first ultrasonic vibrator OS1 422*a* may remain in an off state during the second round. In a third round of humidifying operation, the first ultrasonic vibrator OS1 422*a* may be again turned on (on3) and then turned off (off3) while the second ultrasonic vibrator OS2 422*b* may remain in an off state during the third round. In a fourth round of humidifying operation, the second ultrasonic vibrator OS2 422*b* may again be turned on (on4) and then turned off (off3), while the first ultrasonic vibrator OS1 422*a* may remain in an off state.

According to an embodiment of the present disclosure, the humidifying assembly 40 may drive the first ultrasonic vibrator 422*a* (OS1) during a first time period to atomize the water contained in the humidifying chamber 421, and then may drive the second ultrasonic vibrator (OS2) 422*b* during a second time period after the first time period to atomize the water contained in the humidifying chamber 421. In this case, the first time period and the second time period may be repeated according to a predetermined cycle. Depending on embodiments, the first time period and the second time period may have the same length. Alternatively, lengths of the respective time periods may also be set to different lengths. For example, the first ultrasonic vibrator 422*a* may be driven for longer or shorter periods than the second ultrasonic vibrator 422*b*. In another example, as depicted in FIG. 11, ultrasonic vibrators OS1 (422*a*) and OS2 (422*b*) may be driven such that one of the rounds (e.g., the third round) may be longer than the other rounds.

Figure 12:
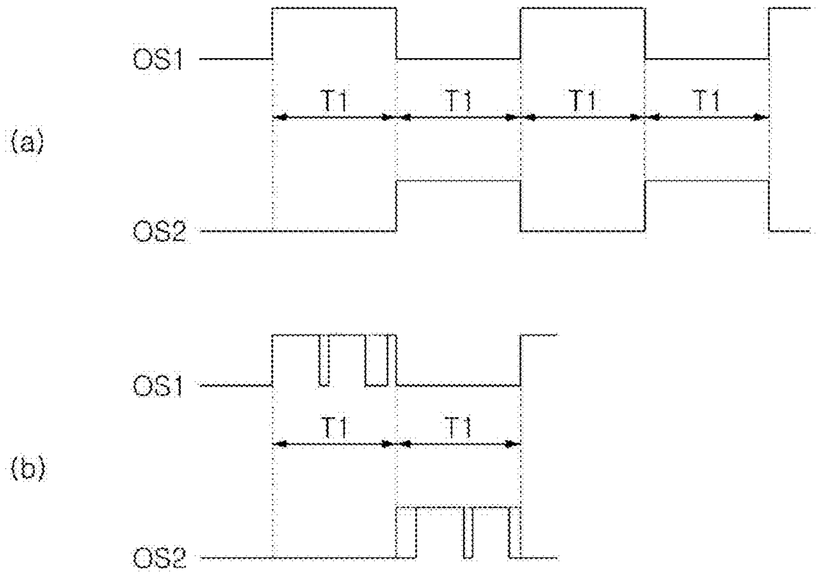

FIG. 12 illustrates an example in which ultrasonic vibrators are controlled based on a same time period T1. Referring to region (a) of FIG. 12, during a first occurrence of time period T1, the first ultrasonic vibrator OS1 422*a* may be driven, and during a second occurrence of time period T1, the second ultrasonic vibrator OS2 422*b* may be driven. This alternating pattern may be repeated such that the first ultrasonic vibrator OS1 422*a* and the second ultrasonic vibrator OS2 422*b* are alternatively driven. Accordingly, during a third occurrence of time period T1, the first ultrasonic vibrator OS1 422*a* is again driven while second ultrasonic vibrator OS2 422*b* is inactive, and during a fourth occurrence of time period T1, the second ultrasonic vibrator OS2 422*b* is driven again while the first ultrasonic vibrator OS1 422*a*.

In one example, the humidifying assembly 40 may drive the ultrasonic vibrator 422 based on various factors, such as a water level of the humidifying chamber 421, the humidity of an indoor space, and a desired humidity or mist amount or other operation mode setting selected by a user. Accordingly, in a time period or round of operation in which the first ultrasonic vibrator OS1 422*a* and the second ultrasonic vibrator OS2 422*b* each are set to be driven separately, the first ultrasonic vibrator OS1 422*a* and the second ultrasonic vibrator OS2 422*b* may be turned on/off repeatedly according to the humidity, mist amount, operation mode, and the like.

In FIG. 12, region (b) illustrates the case where in the first occurrence of the first occurrence of time period T1 in which only the first ultrasonic vibrator OS1 422*a* is selectively driven (e.g., based on the ambient humidity level, water level, desired, mist amount, operation mode, and the like), the second ultrasonic vibrator OS2 422*b* remains in an off state, and only the first ultrasonic vibrator OS1 422*a* is turned on/off. In addition, region (b) of FIG. 12 illustrates that during the second occurrence of the time period T1, only the second ultrasonic vibrator OS2 422*b* is driven, and the first ultrasonic vibrator OS1 422*a* remains in an off state, and only the second ultrasonic vibrator OS2 422*b* is turned on/off based on factors, such as the ambient humidity level, water level, desired, mist amount, operation mode, and the like According to an embodiment of the present disclosure, the humidifying assembly 40 may alternately control the first and second ultrasonic vibrators 422*a* and 422*b* based on a usage time. For example, once a usage time of any one of the first and second ultrasonic vibrators 422*a* and 422*b* reaches a reference time, the humidifying assembly 40 may drive a remaining ultrasonic vibrator, and if a usage time of the remaining ultrasonic vibrator reaches the reference time, the humidifying assembly 40 may reset the usage time, thereby repeatedly performing the alternating control operation based on the usage time.

Figure 13:
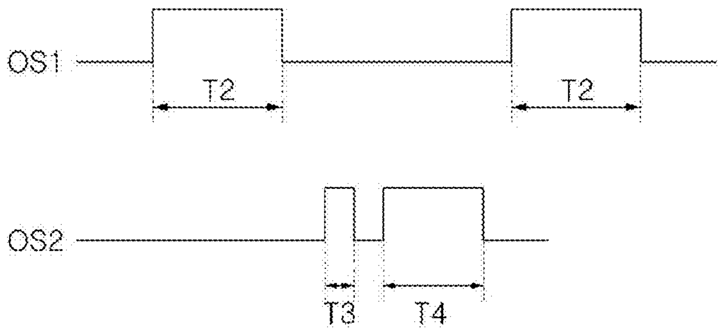

Referring to FIG. 13, the first ultrasonic vibrator OS1 422*a* may be first driven until a total usage time for the first ultrasonic vibrator OS1 422*a* during that time period reaches a predetermined reference time T2. Then, the second ultrasonic vibrator OS2 422*b* may be driven until a total usage time for the second ultrasonic vibrator OS2 422*b* that second time period reaches the predetermined reference time T2. For example, if the second ultrasonic vibrator OS2 422*b* is first driven for a time T3 shorter than the reference time T2, the second ultrasonic vibrator OS2 422*b* may be driven again thereafter for additional time (T$). When an accumulated usage time T3+T4 for the second ultrasonic vibrator OS2 422*b* during that second time period reaches the reference time T2, the usage time of the ultrasonic vibrators 422 may be reset. Then, the first ultrasonic vibrator OS1 422*a* may again be used until the accumulated usage time for the first ultrasonic vibrator OS1 422*a* reaches the reference time T2. In another example, in response to a usage time of an ultrasonic vibrator that is driven first, the usage time of a remaining ultrasonic vibrator may be determined without using the predetermined reference time T2.

Figure 14:
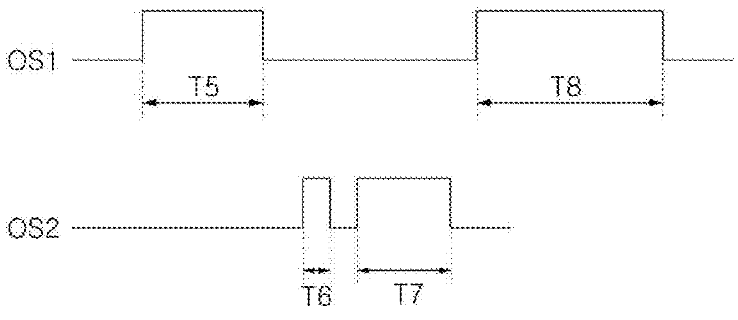

Referring to FIG. 14, the first ultrasonic vibrator OS1 422*a* may be first driven during a predetermined time T5. Then, the second ultrasonic vibrator OS2 422*b* may be driven until a usage time of the second ultrasonic vibrator OS2 422*b* reaches the usage time T5 of the first ultrasonic vibrator OS1 422*a*. If the second ultrasonic vibrator OS2 422*b* is driven during a time T6 shorter than the usage time T5 of the first ultrasonic vibrator OS1 422*a*, the second ultrasonic vibrator OS2 422*b* is driven again thereafter. If an accumulated usage time T6+T7 of the second ultrasonic vibrator OS2 422*b* after reset reaches the usage time T5 of the first ultrasonic vibrator OS1 422*a*, the usage time of the ultrasonic vibrators 422 is reset.

Then, the first ultrasonic vibrator OS1 422*a* may be used again until a predetermined time T8. In this embodiment, the reference time is not preset, such that the usage times T5 and T8 of the first ultrasonic vibrator OS1 422*a* may be changed. Subsequently, the second ultrasonic vibrator OS2 422*b* may be driven until the usage time of the second ultrasonic vibrator OS2 422*b* reaches the usage time T8 of the first ultrasonic vibrator OS1 422*a*.

Figure 15:
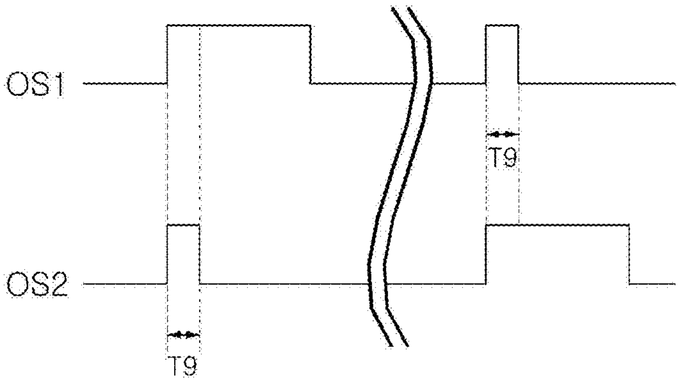

Referring to FIG. 15, the humidifying assembly 40 may initially drive both of the first and second ultrasonic vibrators 422*a* and 422*b* together during a predetermined initial driving time T9, and then after the initial driving time T9, the humidifying assembly 40 may turn off any one of the first and second ultrasonic vibrators 422*a* and 422*b*. Depending on specifications of the first and second ultrasonic vibrators 422*a* and 422*b*, a mist amount that meets a user's request may not be provided. Accordingly, the humidifying assembly 40 may drive both of the first and second ultrasonic vibrators 422*a* and 422*b* together during the initial driving time T9, and then after the initial driving time T9, the humidifying assembly 40 may turn off any one of the ultrasonic vibrators and then enters an alternating control mode, such as those described above with respect to FIGS. 11-14. As further depicted in FIGS. 15, the humidifying assembly 40 may initially drive both of the first and second ultrasonic vibrators 422*a* and 422*b* together during a predetermined initial driving time T9 following a prior time period in which both of the first and second ultrasonic vibrators 422*a* and 422*b* are inactive for at least a threshold length of time.

Figure 16:
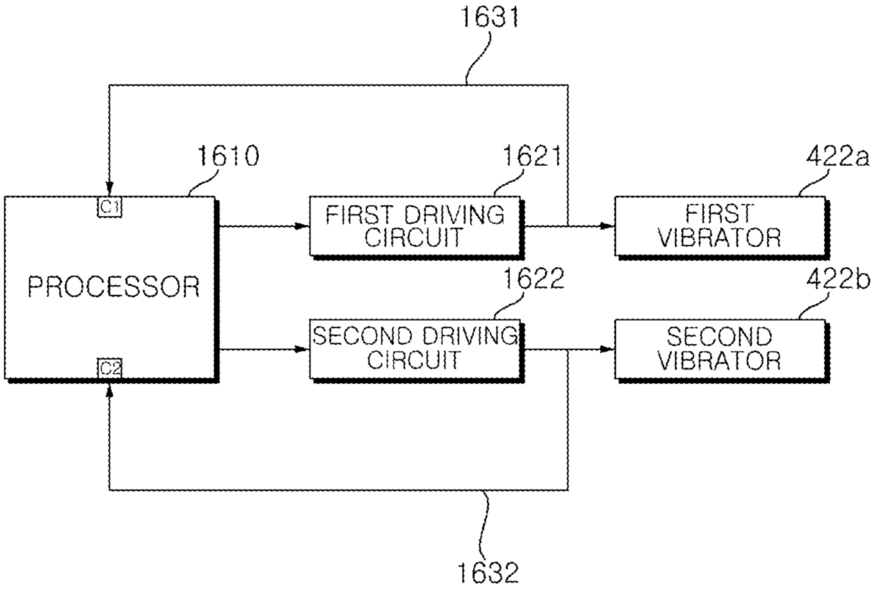
FIG. 16 is a block diagram illustrating components for controlling vibrators in a humidifier and diagnosing failure thereof according to an embodiment.

FIG. 16 is a block diagram illustrating main components for controlling vibrators and diagnosing failure thereof according to an embodiment. Referring to FIG. 16, the humidifier 1 may include a first driving circuit 1621 configured to supply a first driving signal to the first ultrasonic vibrator 422*a* to drive the first ultrasonic vibrator 422*a*, and a second driving circuit 1622 configured to supply a second driving signal to the second ultrasonic vibrator 422*b* to drive the second ultrasonic vibrator 422*b*. For example, first and second driving circuits 1621 and 1622 may receive power from a power source, convert the received power to drive the ultrasonic vibrators 422*a*, 422*b*, and switch the converted power one and off to form the driving signals.

The first and second driving circuits 1621 and 1622 may drive the first and second ultrasonic vibrators 422*a* and 422*b* by generating a PWM signal or other signal for driving the corresponding one of first and second ultrasonic vibrator 422*a* and 422*b* under the control of the processor 1610. In certain example, the processor 1610 may correspond the controller 34 or any one of the processors or printed circuit boards (PCBs) included in the controller 34.

First and second feedback lines 1631 and 1632 may include first ends connected between the first and second driving circuits 1621 and 1622 and the first and second ultrasonic vibrators 422*a* and 422*b*, and may include second ends connected to the processor 1610. For example, the processor 1610 may include first and second terminals C1 and C2, which are connected to the first and second feedback lines 1631 and 1632, respectively.

The humidifier 1 according to an embodiment of the present disclosure may include the case 10, the humidifying assembly 40 disposed in the case 10 and including the first and second ultrasonic vibrators 422*a* and 422*b*, the first driving circuit 1621 configured to supply the first driving signal to the first ultrasonic vibrator 422*a* to drive the first ultrasonic vibrator 422*a*, the second driving circuit 1622 configured to supply the second driving signal to the second ultrasonic vibrator 422*b* to drive the second ultrasonic vibrator 422*b*, and the processor 1610 connected between the first driving circuit 1621 and the first ultrasonic vibrator 422*a* through the first feedback line 1631 and connected between the second driving circuit 1622 and the second ultrasonic vibrator 422*b* through the second feedback line 1632, In this context, the processor 1610 may turn off any one of the first and second ultrasonic vibrators 422*a* and 422*b* based on a signal received through the first and second feedback lines 1631 and 1632. For example, the processor 1610 may receive feedback signals regarding the first and second driving signals through the first and second feedback lines 1631 and 1632, and determine whether a failure occurs in one or more of the first and second ultrasonic vibrators 422*a* and 422*b* based on the received feedback signals. The processor 1610 may determine whether a failure occurs based on an analog signal output from the first and second feedback lines 1631 and 1632. For example, in the case where the first and second driving signals input by to the first and second ultrasonic vibrators 422*a* and 422*b* have certain power values (e.g., 2.5 V or 3.8 V), if a feedback signal of relatively greater power value (e.g., 5 V or more) is received from one of the first and second feedback lines 1631 and 1632, the processor 1610 may determine that a short circuit failure occurs. In this example, if a feedback signal of relatively lower power level (e.g., 0 V) is received from one of the first and second feedback lines 1631 and 1632, the processor 1610 may determine that an open circuit failure occurs. Depending on the particular embodiments, one or more of the first and second feedback lines 1631 and 1632 may include at least one of an amplifier circuit for signal amplification, a signal processing circuit for outputting a predetermined high signal for a signal at a predetermined level or higher and outputting a predetermined low signal for a signal at a predetermined level or lower, etc., thereby generating a feedback signal used by the processor 1610 for determining an occurrence of failure with improve accuracy.

Upon determining that any one of the first and second ultrasonic vibrators 422*a* and 422*b* may have broken down, the processor 1610 may maintain the broken ultrasonic vibrator in an off state, and may operate only a remaining ultrasonic vibrator. In addition, upon determining that any one of the first and second ultrasonic vibrators 422*a* and 422*b* has broken down, the processor 1610 may output an indication of the broken ultrasonic vibrator on a display or to an external device of a user. For example, processor 1610 may activate a warning light or emit a warning sound. In another example, in response to determining that both of the first and second ultrasonic vibrators 422*a* and 422*b* have broken down, the processor 1610 may cause an indication of a final failure to be output via a display, speaker, external device, etc. Thus, upon determining that one of the first and second ultrasonic vibrators 422*a* and 422*b* has broken down, the processor 1610 may control information about the broken ultrasonic vibrator to be output, and if both of the first and second ultrasonic vibrators 422*a* and 422*b* have broken down, the processor 1610 may control final failure information to be output.

Figure 17:
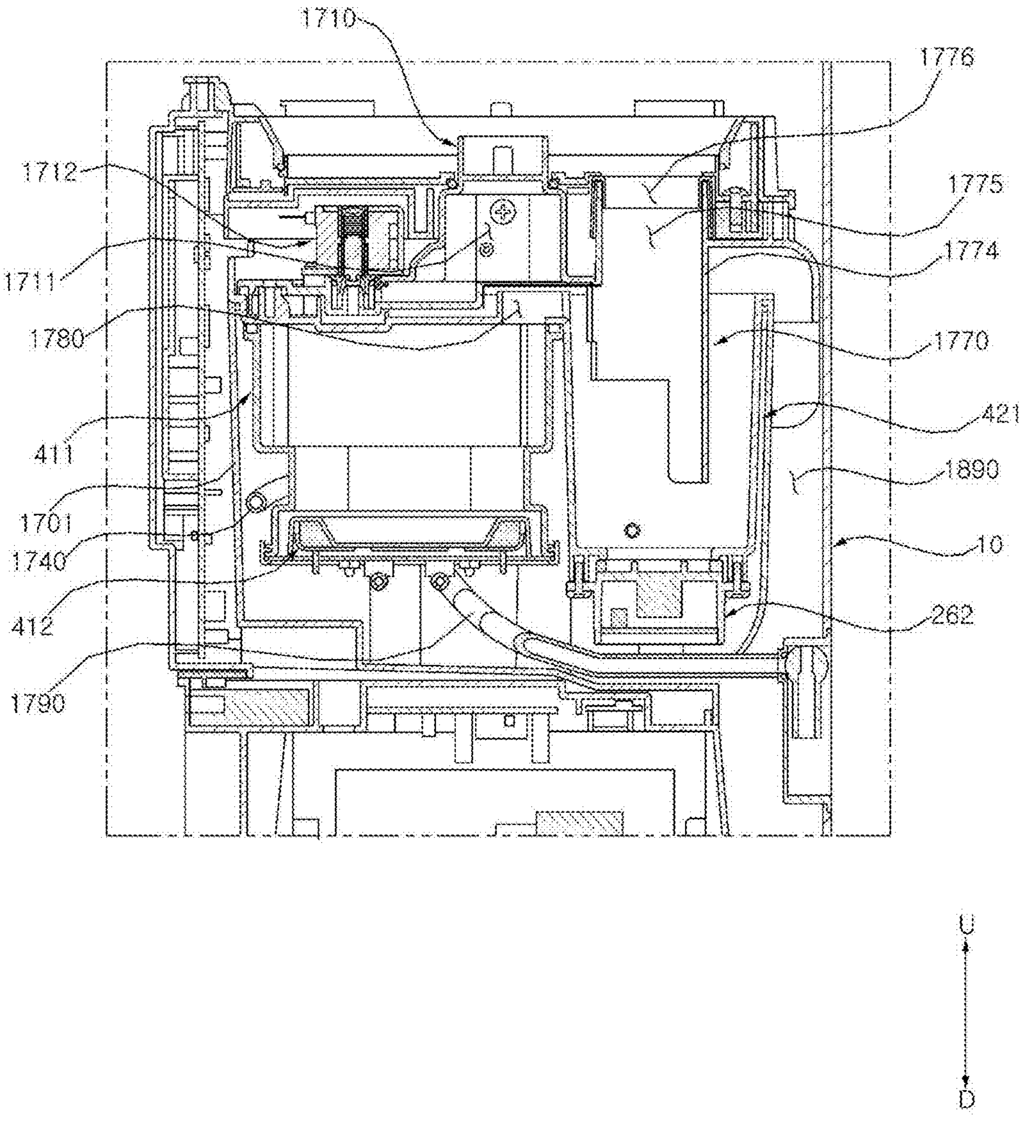
FIG. 17 is a longitudinal cross-sectional view of a humidifying assembly in a humidifier according to an embodiment.

While FIG. 4 illustrates an example of supplying water using a floating valve 43 and the structure of the humidifying assembly 40, the present disclosure is not limited thereto. For example, the embodiments of the present disclosure may supply water by using a solenoid valve, and may also be applied to the humidifying assembly 40 having other structures. For example, FIG. 17 depicts a longitudinal cross-sectional view of a humidifying assembly according to an embodiment. Referring to FIG. 17, the humidifying assembly 40 may include a main housing 1701, a supply pipe 1710, a first valve 1712, a heating chamber 411, a first connection pipe 1740, a drain pipe 1790, a humidifying chamber 421, and a partition cover 1770.

The main housing 1701 may be disposed in the case 10. The main housing 1701 may accommodate the humidifying chamber 421 and the heating chamber 411, which are previously described. The main housing 1701 may have an open top.

The supply pipe 1710 may be a pipe through which water is supplied to the humidifying assembly 40. The supply pipe 1710 may be connected to the humidifying assembly 40. Water contained in the water tank 20 may be supplied to the humidifying assembly 40 through the supply pipe 1710. For example, the water stored in the water tank 20 may move to the heating chamber 411 through the supply pipe 1710. A supply chamber 1711 may be formed in the supply pipe 1710. The water introduced into the supply pipe 1710 may pass through the supply chamber 1711 to flow to the heating chamber. The water introduced into the supply pipe 1710 may be temporarily stored in the supply chamber 1711.

The first valve 1712 may control the flow of water supplied to the humidifying assembly 40 through the supply pipe 1710. For example, when the first valve 1712 is opened, the water stored in the supply chamber 1711 may move to the heating chamber 411. By contrast, if the first valve 1712 is closed, the supplied water may be temporarily stored in the supply chamber 1711. The first valve 1712 may be opened and closed in response to an electrical signal of the controller 34, and in certain examples, the first valve 1712 may receive power from the controller 34. In one implementation, the first valve 1712 may be a solenoid valve. The first valve 1712 may be disposed above the heating chamber 411. The first valve 1712 may be disposed at the supply pipe 1710. For example, the first valve 1712 may be disposed between the heating chamber 411 and the supply pipe 1710. The first valve 1712 may be upwardly spaced apart from the heating chamber 411. For example, the first valve 1712 may be upwardly spaced apart from an upper surface of the heating chamber 411.

The heating chamber 411 may be disposed in the main housing 1701. The heating chamber 411 may heat the water introduced through the supply pipe 1710. The heating chamber 411 may heat and sterilize water. An amount of the water heated in the heating chamber 411 may flow to the humidifying chamber 421.

The first connection pipe 1740 may be a pipe through which water stored in the heating chamber 411 flows to the humidifying chamber 421. The first connection pipe 1740 may slope downwards toward the humidifying chamber 421 and have a height that decreases toward a downstream side. The first connection pipe 1740 may be inclined downwardly toward the downstream side. The first connection pipe 1740 may have high thermal conductivity, and may be formed from metal or other materials with high thermal conductivity. The water heated in the heating chamber 411 may decrease in temperature while flowing in the first connection pipe 1740 due to heat from the water being exchanged to the first connection pipe 1740.

The drain pipe 1790 may be connected to the heating chamber 411. The drain pipe 1790 may discharge remaining water stored in the heating chamber 411. The remaining water may be discharged to the outside of the case 10 through the drain pipe 1790. The drain pipe 1790 may be connected to a lower part of the heating chamber 411. For example, the drain pipe 1790 may be connected to a lower or a bottom surface of the heating chamber 411.

The humidifying chamber 421 may generate humidified air by using the supplied water. The humidified air may refer to air containing mist and/or water vapor. The humidifying chamber 421 may generate humidified air by using any one of an ultrasonic type, a heating type, an evaporative type, and a disk type. For example, the humidifying chamber 421 may generate humidified air by atomizing the supplied water using an ultrasonic vibrator.

A humidifier water tank may include a vibrator 262. The vibrator 262 may be disposed on a bottom or other surface of the humidifying chamber 421. The vibrator 262 may atomize water into fine droplets by using ultrasonic vibration. The vibrator 262 may correspond to otherwise include the ultrasonic vibrator 422 described above.

The partition cover 1770 may be disposed at an upper side of the main housing 1701. The partition cover 1770 may cover the upper part of the heating chamber 421. The partition cover 1770 may separate a passage for water to flow into the humidifying chamber 421 from a passage for water to be discharged from the humidifying chamber 421. For example, the partition cover 1770 may include an air supply pipe 1710, which is a passage through which a portion of upwardly flowing air, flowing in an internal air-blowing passage 1890 is introduced into the humidifying chamber 421, and a discharge pipe 1774 through which the portion of the upwardly flowing air introduced into the humidifying chamber 421 and mist remaining stagnant in the humidified chamber 421 are discharged together. The air supply pipe 1710 may connect the internal air-blowing passage 1890 and the humidifying chamber 421. The upwardly flowing air flowing into the humidifying chamber 421 may carry upwards the mist generated in the humidifying chamber 421. In this manner, the mist generated in the humidifying chamber 421 may be discharged. The discharge pipe 1774 may extend in an up-down direction. The discharge pipe 1774 may form a discharge passage 1775. A humidified air discharge port 1776 may be formed at one end of the discharge pipe 1774. The discharge pipe 1774 may be inserted into the humidifying chamber 421.

The humidifying assembly 40 may include a communication passage 1780 connecting the heating chamber 411 and the humidifying chamber 421. The communication passage 1780 may connect an upper portion of the heating chamber 411 and an upper portion of the humidifying chamber 421. Water vapor may be generated when the heating chamber 411 heats the supplied water. The generated water vapor may flow to the humidifying chamber 421 through the communication passage 1780. The discharge pipe 1774 may be opened toward the communication passage 1780. The communication passage 1780 may be connected to the discharge passage 1775. The water vapor moving from the heating chamber 411 to the humidifying chamber 421 through the communication passage 1780 may be discharged through the discharge pipe 1774. In this manner, the humidified air may contain the water vapor generated in the heating chamber 411, the mist generated in the humidified chamber 421, and a portion of the upward air flow generated by the blower fan 32. The humidified air generated in the heating chamber 411 and the humidified air generated in the humidifying chamber 421 may be discharged together, such that pleasant, humidified air including both water vapor and atomized water droplets may be provided.

FIG. 18 is a schematic view of a humidifier according to an embodiment. Referring to FIG. 18, a humidifier 1 according to an embodiment may include the case 10, the water tank 20, the humidifying assembly 40, and the blower fan 32.

Indoor air may be introduced through an inlet 11 formed in the case 10 as input air (Fi). The inlet 11 may be formed at a lower part of the case 10. The air introduced into the case 10 may flow through a channel formed therein for the input air (Fi). The air flowing in the case 10 may be discharged back into a room through the outlet 12 formed at an upper part of the case 10. In this case, the discharged air may have a higher humidity than the humidity of the drawn input air (Fi).

The water tank 20 may store water. The water tank 20 may include a water storage space 1810 in which water is contained. The water stored in the water storage space 1810 may be supplied to the humidifying assembly 40 as supplied water (Fs1). The humidifying assembly 40 may generate humidified air by using the supplied water (Fs1).

The humidifying assembly 40 may generate humidified air from the suppled water (Fs1). The humidified air may contain mist and/or water vapor. That is, the humidified air may refer to air containing mist and/or water vapor. The humidified air may have a higher humidity than the humidity in a room.

The humidifying assembly 40 may include a heating chamber 411. The supplied water (Fs1) from the water tank 20 may be introduced into the heating chamber 411. The heating chamber 411 may heat the suppled water (Fs1) from the water tank 20. For example, the heating chamber 411 may heat the supplied water (Fs1) to sterilize the supplied water.

The humidifying assembly 40 may include a humidifying chamber 421. The supplied water (Fs1) in the heating chamber 411 may move to the humidifying chamber 421. The humidifying chamber 421 may generate humidified air by using the water (Fs1) supplied from the heating chamber 411. The humidifying chamber 421 may generate humidified air by using any one of an ultrasonic type, a heating type, an evaporative type, and a disk type. For example, the humidifying chamber 421 may generate humidified air by atomizing the supplied water (Fs1) using an ultrasonic vibrator 422.

The blower fan 32 may be disposed in the case 10. The blower fan 32 may be disposed below the humidifying assembly 40. The blower fan 32 may generate a flow of input air (Fi) in the case. The blower fan 32 may generate a flow of the input air (Fi) from the inlet 11 and toward the outlet 12. For example, the blower fan 32 may generate an upward flow of air flowing from the inlet 11, formed at a lower portion of the case 10, toward the outlet 12 formed in an upper surface of the case 10.

The case 10 may include an internal air-blowing passage 1890. The internal air-blowing passage 10 may be formed in the case 10. The internal air-blowing passage 1890 may be a passage through which air blown by the blower fan 32 flows. The input air (Fi) introduced through the inlet 11 may flow toward the blower fan 32 through a suction passage 330. The input air (Fi), having passed through the blower fan 32, may flow through the internal air-blowing passage 1890.

The case 10 may include a discharge passage 1000. The discharge passage 1000 may be formed in the case 10. The discharged air (Fd), having passed through the internal air-blowing passage 1890, may flow to the discharge passage 1000. The discharge passage 1000 may be disposed at an upper part of the internal air-blowing passage 1890. The discharge passage 1000 may be disposed on a downstream side of the internal air-blowing passage 1890.

The discharge passage 1000 may include a first discharge passage 1000*b* and a second discharge passage 1000*a*. The discharge port 12 may include a first discharge port 12*b* corresponding to the first discharge passage 1000*b* and a second discharge port 12*a* corresponding to the second discharge passage 1000*a*. The second discharge passage 1000*a* may be formed in the case 10. The first discharge passage 1000*b* may be formed radially within the second discharge passage 1000*a*. The second discharge passage 1000*a* may be connected to the internal air-blowing passage 1890. The second discharge passage 1000*a* may be disposed on a downstream side of the internal air-blowing passage 1890. A first portion of the discharged air (Fd2) may pass through the internal air-blowing passage 1890 and flow upward through the second discharge passage 1000*a*. The first portion of the discharged air (Fd2), having passed through the second discharge passage 1000*a*, may be supplied to an indoor space through the second discharge port 12*a*.

A remaining, second portion of the input air (Fs2), having passed through the internal air-blowing passage 1890, may flow to the humidifying assembly 40. The remaining, second portion of the input air (Fs2), having passed through the internal air-blowing passage 1890, may flow to the humidifying chamber 421. The remaining, second portion of the input air (Fs2), after being introduced into the humidifying chamber 421 may flow through the first discharge passage 1000*b* along with the humidified air (Fd1) generated in the humidifying chamber 421. The humidified air (Fd1) flowing through the first discharge passage 1000*b* may be supplied to an indoor space through the first discharge port 12*b*.

It is an aspect of the present disclosure to provide a humidifier capable of adjusting the direction and shape of mist. It is yet another aspect of the present disclosure to provide a humidifier capable of providing various mist modes. It is yet another aspect of the present disclosure to provide a humidifier with improved product life and reliability. It is further another aspect of the present disclosure to provide a humidifier capable of discharging together humidified air generated in a heating chamber and humidified air generated in a humidifying chamber. The aspect of the present disclosure are not limited to the aforementioned objectives and other objectives not described herein will be clearly understood by those skilled in the art from the foregoing description.

In order to achieve the above aspects, a humidifier according to an embodiment of the present disclosure includes a plurality of ultrasonic vibrators and controls each of the plurality of ultrasonic vibrators, thereby adjusting the direction and shape of mist and providing various mist modes. In order to achieve the aspects, a humidifier according to an embodiment of the present disclosure includes a plurality of ultrasonic vibrators and effectively controls each of the plurality of ultrasonic vibrators, thereby improving the product life.

In order to achieve the above aspects, a humidifier according to an embodiment of the present disclosure includes a plurality of ultrasonic vibrators and is configured to effectively determine whether a failure occurs in the ultrasonic vibrators and drive an ultrasonic vibrator which is in a normal state, thereby improving reliability. In order to achieve the above aspects, a humidifier according to an embodiment of the present disclosure includes: a case; and a humidifying assembly disposed in the case and configured to generate mist, wherein the humidifying assembly includes a humidifying chamber defining a space in which water is contained, and first and second ultrasonic vibrators disposed under the humidifying chamber, thereby improving humidification performance and product life.

The humidifier according to an embodiment of the present disclosure may drive one of the first and second drive one of the first and second ultrasonic vibrators, or may drive the first and second ultrasonic vibrators with different driving signals, thereby adjusting the direction and shape of mist and providing various mist modes. The humidifier according to an embodiment of the present disclosure may alternately drive the first and second ultrasonic vibrators according to a predetermined cycle, thereby improving the product life.

A duty ratio of a Pulse Width Modulation (PWM) driving signal for driving the first ultrasonic vibrator may be different from a duty ratio of a PWM driving signal for driving the second ultrasonic vibrator. The duty ratios of the PWM driving signals for driving the first ultrasonic vibrator and the second ultrasonic vibrator may be individually adjusted.

In a predetermined mode, variable resistor values may be changed differently so that a value of a variable resistor, connected to the first ultrasonic vibrator, may be different from a value of a variable resistor connected to the second ultrasonic vibrator. Each time the humidifying assembly is turned on, the humidifying assembly may be configured to drive a different ultrasonic vibrator.

The humidifying assembly may be configured to drive the first ultrasonic vibrator during a first time period to atomize the water contained in the humidifying chamber, and to drive the second ultrasonic vibrator during a second time period after the first time period to atomize the water contained in the humidifying chamber. The first time period and the second time period may be repeated according to a predetermined cycle. The first time period and the second time period may have a same length.

In response to a usage time of any one of the first and second ultrasonic vibrators reaching a reference time, the humidifying assembly may be configured to drive a remaining ultrasonic vibrator, and in response to a usage time of the remaining ultrasonic vibrator reaching the reference time, the humidifying assembly may be configured to reset the usage time. The humidifying assembly may be configured to drive the first and second ultrasonic vibrators during a predetermined initial driving time, and then after lapse of the initial driving time, the humidifying assembly may be configured to turn off any one of the first and second ultrasonic vibrators.

The humidifier according to an embodiment of the present disclosure may further include: a first driving circuit configured to supply a first driving signal to the first ultrasonic vibrator to drive the first ultrasonic vibrator; a second driving circuit configured to supply a second driving signal to the second ultrasonic vibrator to drive the second ultrasonic vibrator; and a processor configured to receive the first and second driving signals through first and second feedback lines, connected between the first and second driving circuits and the first and second ultrasonic vibrators, to determine whether a failure occurs in the first and second ultrasonic vibrators. Upon determining that any one of the first and second ultrasonic vibrators breaks down, the processor may be configured to maintain the broken ultrasonic vibrator in an off state, and to operate only a remaining ultrasonic vibrator.

The humidifying assembly may include: an inlet through which air is introduced into the humidifying chamber; an outlet through which mist generated in the humidifying chamber is discharged; a heating device configured to heat water and communicating with the humidifying chamber; and a body having a first opening communicating with the heating device, and a second opening communicating with the humidifying chamber, wherein the first and second ultrasonic vibrators may be spaced below the outlet.

The humidifier according to an embodiment of the present disclosure may further include: a suction port through which air is introduced into the case; a fan disposed in the case; a discharge port through which the air introduced through the suction port flows; an air-blowing passage through which air blown by the fan flows, the air-blowing passage extending toward the discharge port; and a humidification passage connecting the humidifying assembly and the discharge port, the humidification passage separated from the air-blowing passage.

A humidifier according to an embodiment of the present disclosure includes: a case; a humidifying assembly disposed in the case and including first and second ultrasonic vibrators; a first driving circuit configured to supply a first driving signal to the first ultrasonic vibrator to drive the first ultrasonic vibrator; a second driving circuit configured to supply a second driving signal to the second ultrasonic vibrator to drive the second ultrasonic vibrator; and a processor connected between the first driving circuit and the first ultrasonic vibrator through a first feedback line and connected between the second driving circuit and the second ultrasonic vibrator through a second feedback line, wherein the processor is configured to turn off any one of the first and second ultrasonic vibrators based on a signal input through the first and second feedback lines.

According to at least one of the embodiments of the present disclosure, by adjusting the direction and shape of mist, various mist modes may be provided. According to at least one of the embodiments of the present disclosure, by effectively controlling ultrasonic vibrators, the product life may be improved. According to at least one of the embodiments of the present disclosure, by effectively determining whether a failure occurs in ultrasonic vibrators and driving an ultrasonic vibrator which is in a normal state, reliability may be improved. According to at least one of the embodiments of the present disclosure, by discharging together humidified air generated in a heating chamber and humidified air generated in a humidifying chamber, thereby providing pleasant, humidified air. The effects of the present disclosure are not limited to the aforesaid, and other effects not described herein will be clearly understood by those skilled in the art from the following description of the appended claims.

While the preferred embodiments have been particularly shown and described, the present specification shall not be limited to the particular embodiments described above, and it will be understood by an ordinary skilled person in the art that various changes in form and details may be made therein without departing from the spirit and scope of the present invention as defined by the following claims, and the alternative embodiments should not be individually understood from the inventive concept and prospect of the present disclosure.

It will be understood that when an element or layer is referred to as being “on” another element or layer, the element or layer can be directly on another element or layer or intervening elements or layers. In contrast, when an element is referred to as being “directly on” another element or layer, there are no intervening elements or layers present. As used herein, the term “and/or” includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as “lower”, “upper” and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as “lower” relative to other elements or features would then be oriented “upper” relative to the other elements or features. Thus, the exemplary term “lower” can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms “a”, “an” and “the” are intended to include the plural forms as well, unless the context clearly indicates otherwise. It will be further understood that the terms “comprises” and/or “comprising,” when used in this specification, specify the presence of stated features, integers, steps, operations, elements, and/or components, but do not preclude the presence or addition of one or more other features, integers, steps, operations, elements, components, and/or groups thereof.

Embodiments are described herein with reference to cross-section illustrations that are schematic illustrations of idealized embodiments (and intermediate structures). As such, variations from the shapes of the illustrations as a result, for example, of manufacturing techniques and/or tolerances, are to be expected. Thus, embodiments should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A humidifier comprising:

a case; and a humidifying assembly disposed in the case and configured to generate mist, wherein the humidifying assembly comprises:

a humidifying chamber configured to hold water, first and second ultrasonic vibrators configured to atomize water in the humidifying chamber, an inlet through which air is introduced into the humidifying chamber, an outlet through which mist generated in the humidifying chamber is discharged, wherein one of the first and second ultrasonic vibrators is driven at a time, or the first and second ultrasonic vibrators are driven with respective different driving signals, wherein the first and second ultrasonic vibrators are spaced below the outlet, wherein the different driving signals include a first driving signal to drive the first ultrasonic vibrator, and a second driving signal to drive the second ultrasonic vibrator, wherein the humidifier further comprises:

a first driving circuit configured to supply the first driving signal to the first ultrasonic vibrator;

a second driving circuit configured to supply the second driving signal to the second ultrasonic vibrator; and a processor configured to:

receive feedback about the first driving signal through a first feedback line having an end connected between the first driving circuit and the first ultrasonic vibrator, receive feedback about the second driving signal through a second feedback line having an end connected between the second driving circuit and the second ultrasonic vibrator, and determine, based on the feedbacks of the first and second driving signals. when a failure occurs in one of the first and second ultrasonic vibrators, and wherein, in response to determining that the failure occurred in the one of the first and second ultrasonic vibrators, the processor is configured to:

maintain, in an off state, the one of the first and second ultrasonic vibrators in which the failure occurred, and operate only a remaining one of the first and second ultrasonic vibrators in which the failure did not occur.

2. The humidifier of claim 1, wherein the respective different driving signals to drive the first and second ultrasonic vibrators include a first Pulse Width Modulation (PWM) driving signal to drive the first ultrasonic vibrator and a second PWM driving signal to drive the second ultrasonic vibrator, and wherein a duty ratio of the first PWM driving signal is different from a duty ratio of the second PWM driving signal.

3. The humidifier of claim 2, wherein the duty ratios of the first and second PWM driving signals to drive, respectively, the first ultrasonic vibrator and the second ultrasonic vibrator are individually adjusted.

4. The humidifier of claim 1, wherein the first ultrasonic vibrator and the second ultrasonic vibrator to have respective different variable resistance values.

5. The humidifier of claim 1, wherein each time the humidifying assembly is turned on, the humidifying assembly is configured to drive, sequentially, a different one of the first ultrasonic vibrator or the second ultrasonic vibrator.

6. The humidifier of claim 1, wherein the humidifying assembly is configured to drive the first ultrasonic vibrator during a first time period to atomize the water contained in the humidifying chamber, and to drive the second ultrasonic vibrator during a second time period after the first time period to atomize the water contained in the humidifying chamber.

7. The humidifier of claim 6, wherein the first time period and the second time period are repeated according to a predetermined cycle.

8. The humidifier of claim 6, wherein the first time period and the second time period have a same length.

9. The humidifier of claim 1, wherein:

in response to a usage time of a first one of the first and second ultrasonic vibrators reaching a reference time during a first time period, the one of the first and second ultrasonic vibrators is deactivated during a second time period, and a second one of the first and second ultrasonic vibrators is driven during the second time period, and in response to a usage time of the second one of first and second ultrasonic vibrators reaching the reference time during the second time period, the usage time of the first one of the first and the second ultrasonic vibrator is reset, and the second one of the first and second ultrasonic vibrators is deactivated.

10. The humidifier of claim 1, wherein both of the first and second ultrasonic vibrators are driven during an initial driving time, and then after the initial driving time, one of the first and second ultrasonic vibrators is turned off.

11. The humidifier of claim 1, wherein the humidifying assembly comprises:

a heating chamber to receive water and communicating with the humidifying chamber;

a heater to heat the water in the heating chamber; and a body having a first opening communicating with the heating chamber, and a second opening communicating with the humidifying chamber.

12. The humidifier of claim 1, further comprising:

a suction port through which air is introduced into the case;

a fan disposed in the case;

an air-blowing passage through which a first portion of air blown by the fan flows, the air-blowing passage bypassing the humidifying assembly;

a humidification passage through which a second portion of air blown by the fan flows after passing through the humidifying assembly, the humidification passage being separated from the air-blowing passage; and a discharge port through which air from the air-blowing passage and the humidification passage are output from the case.

13. A humidifier, comprising:

a case;

a humidifying chamber configured to hold water; and a plurality of ultrasonic vibrators disposed under the humidifying chamber, an inlet through which air is introduced into the humidifying chamber, and an outlet through which mist generated in the humidifying chamber is discharged, wherein the plurality of ultrasonic vibrators include first and second ultrasonic vibrators that are alternatively driven according to a predetermined cycle, wherein the first and second ultrasonic vibrators are spaced below the outlet, and wherein the humidifier further comprises:

a first driving circuit configured to supply a first driving signal to the first ultrasonic vibrator;

a second driving circuit configured to supply a second driving signal to the second ultrasonic vibrator; and a processor configured to:

receive feedback regarding the first and second driving signals through first and second feedback lines electrically connected to, respectively, the first and second ultrasonic vibrators, determine when a failure occurs in one of the first and second ultrasonic vibrators, and in response to determining that the failure occurs in one of the first and second ultrasonic vibrators, maintain the one of the first and second ultrasonic vibrators in which the failure occurs in an off state, and operate only a remaining one of the first and second ultrasonic vibrators in which the failure did not occur.

14. The air purifier of claim 13, wherein the first ultrasonic vibrator is driven during a first time period to atomize the water contained in the humidifying chamber, and the second ultrasonic vibrator is driven during a second time period after the first time period to atomize the water contained in the humidifying chamber.

15. The air purifier of claim 14, wherein the first time period and the second time period are repeated according to the predetermined cycle.

16. The air purifier of claim 14, wherein the first time period and the second time period have a same length.

* * * * *